United States Patent
Farhangi et al.

(10) Patent No.: US 9,794,360 B1
(45) Date of Patent: Oct. 17, 2017

(54) ESTIMATING UNIQUE VIEWERS OF MEDIA CONTENT WITHOUT COOKIES

(71) Applicant: Amazon Technologies, Inc., Seattle, WA (US)

(72) Inventors: Alireza Farhangi, Vancouver (CA); Georgii Kravchenko, Vancouver (CA); Oleksandr Bereznevatyi, Burnaby (CA); Dmytro Shevchenko, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 216 days.

(21) Appl. No.: 14/852,317

(22) Filed: Sep. 11, 2015

(51) Int. Cl.
*G06F 15/16* (2006.01)
*H04L 29/08* (2006.01)
*H04L 29/06* (2006.01)
*H04L 12/26* (2006.01)
*G06F 21/10* (2013.01)
*G06Q 30/02* (2012.01)
*H04N 21/442* (2011.01)

(52) U.S. Cl.
CPC .............. *H04L 67/22* (2013.01); *H04L 43/04* (2013.01); *H04L 65/4007* (2013.01); *H04L 67/02* (2013.01); *G06F 21/10* (2013.01); *G06Q 30/0201* (2013.01); *H04N 21/44204* (2013.01)

(58) Field of Classification Search
CPC ... H04L 67/22; H04N 21/442–21/4425; G06Q 30/0201; G06F 21/10–21/645
See application file for complete search history.

(56) References Cited

U.S. PATENT DOCUMENTS

| | | | |
|---|---|---|---|
| 2011/0029666 A1* | 2/2011 | Lopatecki | G06F 15/16 709/224 |
| 2015/0046579 A1* | 2/2015 | Perez | H04L 67/306 709/224 |
| 2016/0029061 A1* | 1/2016 | Pizzurro | G06Q 30/02 725/14 |
| 2016/0212233 A1* | 7/2016 | Besehanic | H04L 61/1511 |
| 2016/0239868 A1* | 8/2016 | Demsey | G06Q 30/0255 |
| 2017/0094331 A1* | 3/2017 | Lopatecki | H04N 21/252 |

* cited by examiner

*Primary Examiner* — David Lazaro
*Assistant Examiner* — Julian Chang
(74) *Attorney, Agent, or Firm* — Knobbe, Martens, Olson & Bear, LLP

(57) ABSTRACT

Systems and methods are provided for determining media engagement information related to client devices that do not support cookies. In some embodiments, a server may receive a request for a portion of live media content from a client device that does not support cookies. The server may identify a unique identifying characteristics associated with the media request. The server may determine a number of concurrent downloads of the live media content that are associated with the unique identifying characteristic. The server may further estimate a number of client devices associated with the unique identifying characteristic that have downloaded the live media content based on the number of concurrent downloads. In some embodiments, the server may also determine a number of computing devices that support cookie information and have downloaded the live media content to determine a total number of computing devices that have downloaded the live media content.

22 Claims, 9 Drawing Sheets

the user to begin experiencing the content before the client device has received all of the content from the content provider. In an example, a user's smart phone may connect to a website via a browser application, request video content hosted on the website, and begin presenting the video to the end user while additional portions of the video are received from the website.
ESTIMATING UNIQUE VIEWERS OF MEDIA CONTENT WITHOUT COOKIES

BACKGROUND

Users of electronic computing devices—such as laptop computers, tablets, smart phones, and desktop computer—are increasingly using these devices to stream content over networks, such as the Internet. Media streaming is a form of content delivery in which a computing device—frequently referred to as a "client device"—requests media content from a content provider and displays the content to an end user while simultaneously obtaining additional content from the content provider. By streaming content, the client device enables the user to begin experiencing the content before the client device has received all of the content from the content provider. In an example, a user's smart phone may connect to a website via a browser application, request video content hosted on the website, and begin presenting the video to the end user while additional portions of the video are received from the website.

Content providers often attempt to determine the number of client devices that have accessed their media in order to estimate the relative success or popularity of their hosted content. For example, a content provider of a video may count the number of client devices that have requests segments of the video in order to estimate how many users have consumed the video.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
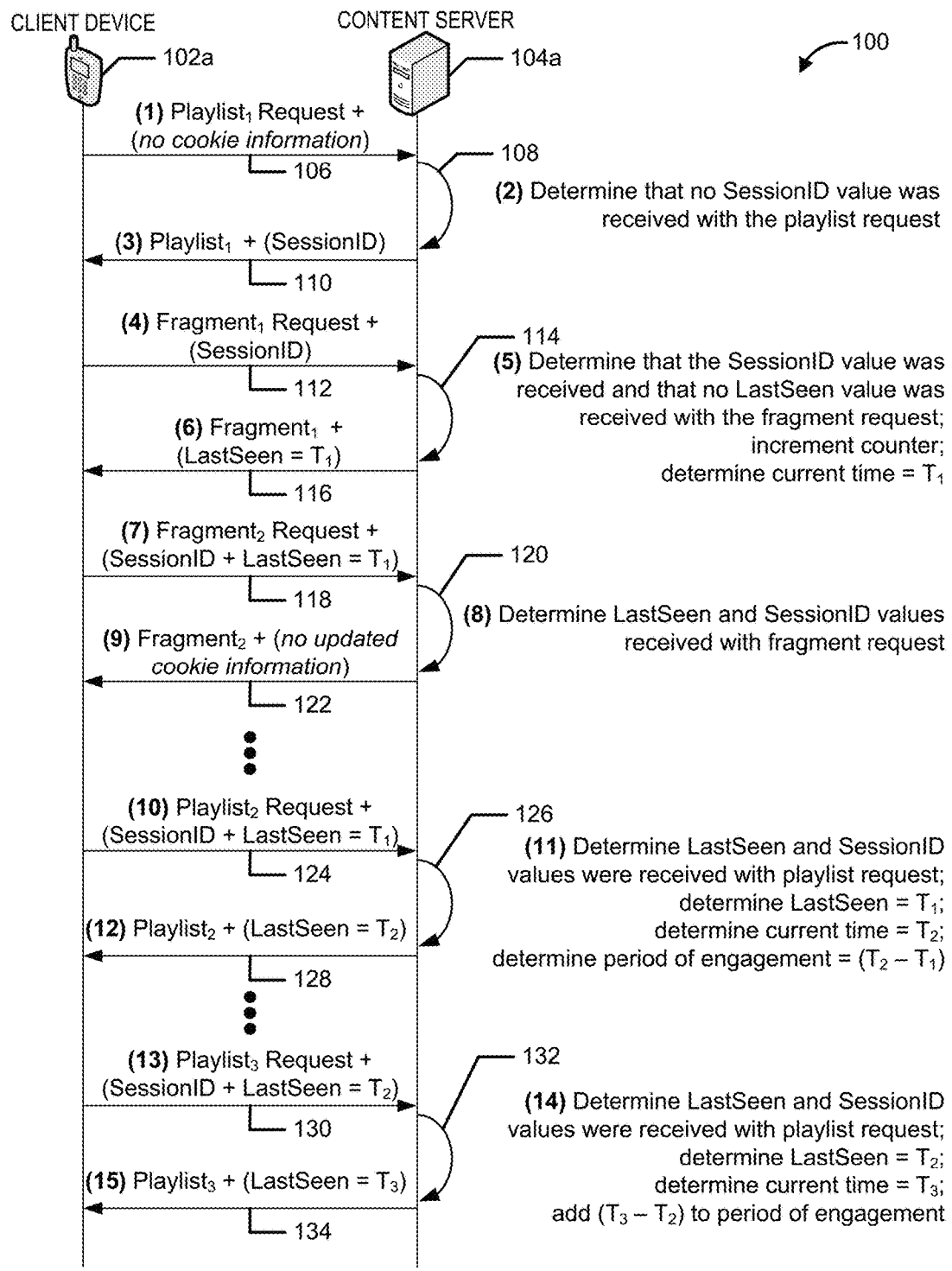
FIG. 1 is a signal and call flow diagram of communications exchanged between a client device and a content server, according to some embodiments.

Media content is stored on the content provider as multiple segments or "fragments" of content. These fragments are typically one- or two-second-long portions of the media content. For example, a thirty-second video hosted on a website may be stored as fifteen to thirty separate fragments. Client devices utilize one of various media-streaming protocols—such as HTTP Live Streaming ("HLS") or Dynamic Adaptive Streaming over HTTP ("DASH")—to retrieve these segments from the content provider in order to display the content to the user. Typically, before downloading the media fragments, a client device must first request a playlist or manifest file from the content provider. The playlist includes the network locations, identities, and the order of the segments related to the requested media content. Upon receiving the playlist from the content provider, the client device may be able to locate and download the segments of the media content in the correct order for playback to the user. In some instances, the playlist may include different versions for each of segments, such as separate high-definition and standard-definition versions of each segment.

Content providers are able to estimate the number of unique computing devices that access media content, such as videos or other media hosted on a website, by generating a hash set based on the identification information received from client devices requesting media content. The content providers are then able to estimate the number of unique visitors based on the size of the hash set. However, in order to make these estimates, the content providers must maintain and process an immense amount of data. For example, the content providers may maintain separate identification information for each of the thousands or even millions of unique visitors. Further, in systems that support requests for media content from multiple content servers (e.g., edge servers) maintained by the content provider, each edge server may only receive a portion of the requests from the client devices requesting the media content. As a result, individual edge servers cannot independently determine information about the consumption of the media content, such as the total number of unique client devices that have downloaded a portion of the media content. As a result, all of the data received at the edge servers must be sent to one or more centralized servers that must then perform computationally expensive operations to compile the received information in order to derive useful information, such as the total number of unique client devices that downloaded the media content. Thus, current systems require a large amount of data storage, data transmission, and processing resources in order to enable content providers to determine how users are engaging media content.

In overview, aspects of the present disclosure include systems and methods for maintaining session state information at client devices in order to reduce the amount of data storage and processing that content providers, via a combination of various server components, require to generate various metrics regarding client-device interactions with hosted media content or media engagement information. Specifically, in some embodiments, a content server hosting media content may execute a media engagement service to send a first portion of stateful information, often referred to as cookie information or cookies, with a client device that requests media content. The media engagement service may receive the previously transmitted first portion of the cookie information from the client devices in conjunction with subsequent requests for media content. In some embodiments, the media engagement service may use the first portion of the cookie information to identify client devices that have not previously accessed or downloaded the media content (e.g., "unique visitors"). The media engagement service may then send a second portion of the cookie information to the client devices to indicate that those client devices have downloaded at least part of the media content. In some embodiments, the media engagement service may use the presence or the absence of one or both of the first and second portions of the cookie information to determine or calculate various other media engagement information, such as how long client devices are actively engaged in streaming the media content.

In some embodiments, a content server, either individually (e.g., see FIG. 1) or as one of a plurality of content servers in communication with one or more central servers (e.g., see FIG. 2), may receive requests for a playlist of media content or requests for a fragment of the media content from client devices. As described above, client devices request a playlist of the media content before requesting specific fragments of the media content. The content server may leverage this expected order of requests from the client device (e.g., a request for a playlist before a request for fragments), along with cookie information stored on the client devices, to determine the session state of client devices that are requesting a playlist or fragment.

In particular, the content server may utilize a value for a first identifier or key in a cookie to indicate whether a client device has previously requested a playlist for the same media content. In particular, the content server may use the first identifier to identify the media content associated with requests from the client device. For example, one first identifier may be associated with a video, and another first identifier may be associated with a different video. For ease of description, this first identifier or key, which may be used as a client identifier to identify a client or client device, may be referred to herein as a "SessionID identifier" or a "session identifier" and may be associated with a value (e.g., a SessionID value). In some embodiments, the content server may quickly identify whether a client device has made a previous request for a playlist for the same media content by determining whether the request was received with the SessionID and a value for the SessionID. In response to receiving a request from a client device for a playlist of the media content without a SessionID value, the content server may send the requested playlist to the client device, as well as cookie information that includes a SessionID and a value for the SessionID, which may be a value uniquely associated with that client device. After receiving the SessionID, the client device may store the SessionID and may include the SessionID with subsequent requests for fragments or playlists of the media content to the content server.

The content server may also utilize a second identifier that stores a value to indicate that the client device has initiated a new session of the media content by downloading fragments of the media content for the first time. For ease of description, the second identifier may be referred to herein as a "LastSeen" identifier and may be associated with a value, generally referred to as a LastSeen value. In some embodiments, in response to receiving a request for a fragment of media content from a client device, the content server may determine whether the request was received with cookie information that includes a SessionID value and a LastSeen value. In response to determining that the request was received with a SessionID value but was not received with a LastSeen value, the content server may determine that the client device is requesting a fragment of the media content for the first time, which may in some cases correspond with a new session of streaming the media content. As such, the content server may quickly identify this client device as a "unique" client device that has initiated a new session of streaming the media content simply by determining that the cookie information for the client device included a SessionID value but did not include a LastSeen value. The content server may then send the fragment of media content to the client devices, as well as updated cookie information that includes a LastSeen value so that the client device will not be counted as new again. As a result, the content server may update a number of unique or new client devices that have downloaded the media content by incrementing a counter for each new client device without generating a hash or performing other intensive data processing. On the other hand, in response to determining that a request from a client device was received with a SessionID value and a LastSeen value, the content device may determine that the client device previously downloaded a fragment of the media content (as indicated by the inclusion of a LastSeen value in the cookie information), and the content server may not increment the counter of new or unique client devices as a result.

In some embodiments, the content server may receive a request from a client device for a fragment of media content that is not received in conjunction with information that may indicate that the client device has previously communicated with the content server, such as a client identifier value (e.g., a SessionID value) or other cookie information that identifies the client device or a particular media session that the client device has previously initiated. In this event, the content server may determine that the requesting client device does not or cannot support cookie information and may designate the client device as not supporting cookie information. Particularly, as described above, the content server may send cookie information to client devices in response to each request for a playlist that is received (as described above). As a result, because client devices must request a playlist file before requesting fragments of media content, a client device that requests a fragment of content without sending a SessionID value or other cookie information did not store a SessionID value that the content server sent to the client device with a requested playlist file.

For pre-generated or on-demand media content (e.g., videos "on demand"), the media content may only include one playlist that identifies all of the fragments of the media content. For such pre-generated media content, a client device may download the playlist from the server and may use information in the playlist to download any number of the fragments, including all of the fragments, without needing to download another playlist. In contrast, live media content may be generated continually/continuously. As such, new fragments of content may be continually made available from the server as new content is generated. Thus, for live media content, the content server may continually generate or obtain new playlists that identify the new fragments of content. In an example, a client device may request and download a first playlist that identifies twenty fragments, and the client device may then request and download the twenty fragments. At a later time (e.g., before playback of the twenty fragments has finished), the client device may request a second playlist that identifies twenty more fragments, which may represent the next twenty seconds of the live media content.

In embodiments in which the media content is live media content, the content server may utilize the cookie information described above to determine other media engagement information, such as how long a client device has been actively presenting the media content to the user. For live media content, the content server may infer that the user has continued experiencing or watching the live media content in the event that the client device continues requesting playlist files. In contrast, a client device that has quickly downloaded all of the fragments of on-demand media content at once may only display a portion of the media content to the user (e.g., the user stops playback), and the content server may therefore be unable to accurately determine how long the user watched the media content.

Thus, in embodiments in which the media content is live, the content server may use the value of the LastSeen identifier to determine how long a client device has been downloading or accessing the media content. Specifically, as described above, in response to determining that a request for a segment of media content includes both a SessionID value but does not include a LastSeen value, the content server may send to the client device a value of the LastSeen identifier that indicates a time at which the request was received. For example, the value of the LastSeen identifier may be a timestamp corresponding to a time at which the request was received, a time at which the content server responded to the request, etc. Thus, in response to receiving a subsequent playlist request from a client device that includes both a SessionID value and a LastSeen value, the content server may determine a current time (e.g., based on a time at which the request was received or a time observed or determined on the content server) and may calculate a difference between the current time and the time indicated by the LastSeen value. The content server may update a total amount of time the client device has downloaded or engaged the live media content by adding the difference to a total amount of time associated with the client device, for example, based on the SessionID uniquely associated with the client device. Thus, by causing the client device to store and share the last time that that client device requested live media content in cookie information, the content server may quickly and efficiently keep track of the overall amount of time that the client device has been engaging/downloading the live media content.

In some aspects described above, the content server may determine various types of media engagement information related to client devices by causing the client devices to store cookie information (e.g., SessionID values and LastSeen values). However, for client devices that do not support cookies, the content server may employ other strategies to estimate the number of new or unique client devices that are downloading live media content. Specifically, the content server may identify each unique combination of one or more identifying characteristics. For example, the combination of identifying characteristics may include one or more of an IP address, the browser application used to download the live media content (e.g., as identified in user agent information, either as a unique identifier, a partial identifier, an indication of the browser type, etc.), a media access control (MAC) number, etc. The content server may determine a number of parallel or concurrent downloads of the live media for each unique combination of identifying characteristics. For example, a first client device may be downloading the live content at the same time that a second client device is downloading the live content. The content server may determine that there are two concurrent downloads of the live media content, and may conclude that there are two unique client devices downloading the live media content that do not support cookies. In some embodiments, in counting the number of unique client devices downloading the live media content that do not support cookie information, the content server may only count downloads that are associated with fragment requests that are not received with a SessionID value or that have otherwise been designated as not supporting cookies.

In some embodiments, the content server may combine media engagement information related to client devices that support cookies with media engagement information related to client devices that do not support cookies, such as by determining a first number of unique client devices that have downloaded at least a portion of the live media content and that support cookie information, estimating a second number of unique client devices that have downloaded at least a portion of the live media content and do not support cookie information, and adding the first number and the second number to yield an estimation of the total number of client devices that have downloaded at least a portion of the live media content.

The various embodiments will be described in detail with reference to the accompanying drawings. Wherever possible, the same reference numbers will be used throughout the drawings to refer to the same or like parts. References made to the particular examples and implementations are for illustrative purposes, and are not intended to limit the scope of the invention or the claims.

FIG. 1 is a signal and call flow diagram that illustrates a system 100 suitable for implementing some aspects of the present disclosure. Specifically, the system 100 may include a client device 102a in communication with a content server 104. Those skilled in the art will recognize that the client device 102a may be any of a number of computing devices that are capable of communicating over a network and capable of streaming hosted media content from content providers. Such computing devices may include, but are not limited to, laptop computers, personal computers, personal digital assistants (PDA), hybrid PDAs/mobile phones, mobile phones, smartphones, wearable computing devices, electronic book readers, digital media players, tablet computer, gaming console or controller, kiosk, augmented reality devices, other wireless devices, set-top or other television boxes, and the like. For example, the client device 102a may be a smartphone configured with a browser application that enables a user to request media content from a website.

The content server 104a may provide access to media content. The content server 104a may store fragments of media content and playlists related to the media content in an internal data store or in a remote data repository utilized by one or more other content servers (e.g., a memory 410 or a remote data store 411 as described with reference to FIG. 4A, respectively). Different media content may be stored in separate folders, and in some embodiments, different versions of media content (e.g., different bit rates) may also be stored separately. Generally, the content server 104a may respond to media requests for playlists or fragments of media content from the computing device 102a by retrieving the playlists or fragments from local or remote storage and providing them to the computing device 102a.

As noted above, the content server 104a may utilize cookie information or other stateful information to identify a session state of client devices or to determine various metrics regarding client devices' engagement with media content. In the example illustrated in FIG. 1, the client device 102a may send a request 106 to the content server 104a for a first playlist corresponding to particular media content (represented in FIG. 1 as "Playlist$_1$"). The first playlist may be, in an example, a playlist for a video hosted on a website maintained by the content server 104a. As described above, the first playlist may identify the network locations of fragments of the media content and the order in which the media fragments must be played out.

Upon receiving the first playlist request 106, the content server 104a may determine, in operation 108, that the first playlist request 106 did not include or was not received with a SessionID value, which may indicate that the client device 102a has not previously requested a playlist or that the client device 102a does not support cookie information. In some embodiments, the SessionID may include or be represented as any information that may enable the content server 104a to identify a particular media session of the media content (e.g., requests or other media consumption information related to the same client device). The SessionID may be a unique combination of numbers and letters that is associated with a particular media session. In some optional embodiments, the value of the SessionID may also be uniquely associated with the client device 102a such that the value is associated with the client device 102a and not with any other client device.

In some embodiments, in response to determining in operation 108 that a SessionID value was not received with the playlist request 106, the content server 104a may generate or obtain a SessionID value. In some embodiments, the SessionID value may be any value that may be stored on the client device 102a and returned to the content server 104a in a subsequent request. In other embodiments, the SessionID value may be uniquely associated with a particular media session engaged in by the client device 102a, which may enable the content server 104a to monitor specific interactions with the client device 102a for use in determining some types of user engagement information (e.g., how long the client device 102a actively downloaded the media content). For example, the content server 104a may generate a numeric SessionID value sequentially for each new media session that is initiated. In another example, the content server 104a may request a SessionID from a central server that coordinates the activities of two or more content servers (e.g., the central server 202 as described with reference to FIG. 2). Once the content server 104a has generated or obtained a SessionID value for media session initiated by the client device 102a, the content server 104a may send a response 110 that includes the first playlist to the client device 102a and that includes the SessionID value associated with the media session initiated by the client device 102a.

Subsequent to sending the first playlist and the SessionID value to the client device 102a in the response 110, the content server 104a may receive a request 112 from the client device 102. As illustrated, the request 112 may include a request for a first fragment of the media content as identified in the first playlist and may also include the SessionID value that the client device 102a received in the response 110 from the content server 104a. In some embodiments (not shown), the client device 102a may have stored the SessionID value with cookie information that is sent with each communication to the content server 104.

In response to receiving the request 112, the content server 104a may determine that the request 112 includes a SessionID value but does not include a LastSeen value, in operation 114. In some embodiments, the content server 104a may determine that the presence of the SessionID value and the absence of the LastSeen value in the request 112 indicate that the client device 102a has previously requested a playlist for the media content but has not yet requested a fragment of the media content. Additionally, the content server 104a may determine that the presence of at least a SessionID value in the request 112 indicates that the client device 102a supports cookie information, whereas a request for a fragment of content that does not include a SessionID value may indicate that the client device does not support cookies, as discussed above. Further, in response to determining in operation 114 that the request 112 was received with a SessionID value but not received with a LastSeen value, the content server 104a may increment a counter that indicates a number of new client devices that have downloaded at least part of the media content. The content server 104a may send a response 116 to the request 112 that includes the first fragment of the media content.

In some embodiments in which the media content is live, the content server 104a may additionally determine a current time (e.g., T$_1$ as illustrated in FIG. 1) based on the time at which the request 112 is received from the client device 102. For example, the content server 104a may reference an internal clock or may obtain a time value from a central server that synchronizes times between multiple content servers. The content server 104 may then send the LastSeen value with the first fragment in the response 116. As further described below, the content server 104a may use this LastSeen value to determine a period of time that the client device 102a has consumed the live media content.

Subsequently, the client device 102a may make one or more requests for fragments of the media content. For example, the client device may send a request 118 for a second fragment of the media content (illustrated in FIG. 1 as "Fragment$_2$"). The request 118 may identify the second fragment and may include the SessionID value received in the response 110, as well as the LastSeen value received in the response 116. In response to receiving the request 118, the content server 104a may determine that the request 118 was received in conjunction with both a SessionID value and a LastSeen value, in operation 120. In response to the request 118, the content server 104a may send a response 122 that includes the second fragment but does not include any updated cookie or stateful information. Specifically, because the request 118 included both a SessionID value and a LastSeen value, the content server 104a may recognize that the client device 102a has previously initiated a media session and, as a result, the client device 102a is not a new or unique viewer/consumer of the media content.

In some optional embodiments, the content server 104a may host live media content. As described above, live media content may differ from pre-recorded or "on-demand" media content because the content server 104a may continually make new fragments of the live media content available to client devices. In particular, as new fragments are generated or obtained, the content server 104a may additionally generate or obtain one or more additional playlists that describe the new fragments. In such embodiments, in order to stream the live media content, the client device 104a may need to download the one or more additional playlists. For example, the first playlist received from the content server 104a in the response 110 (Playlist$_1$) may include information for fragments 1-10 of the live media content. Thus, when the next ten fragments of the live media content are available, the content server 104a may need to download a second playlist available to enable client devices to identify the location and order of the next ten fragments.

In the example illustrated in FIG. 1, in order to continue streaming the live media content, the client device 102a may send a request 124 to the content server 104a for the second playlist (illustrated in FIG. 1 as "Playlist$_2$"). As discussed above, the request 124 may include the SessionID value received from the content server 104a in the response 110, as well as the LastSeen value (T$_1$) received from the content server 104a in the response 118.

In response to receiving the request 124, the content server 104a may determine that the client device 102a is requesting a playlist and that the client device 102a has provided both a SessionID value and a LastSeen value with the request 124. In operation 126, the content server 104a may determine the time associated with the last time that the client device 102a requested a playlist based on the LastSeen value included in the request 124, determine a current time based on the time at which the request 124 was received, and calculate a period of engagement based on the difference between the current time and the time associated with the LastSeen value included in the request 124. For example, the content server 104a may determine that the LastSeen value included in the request 124 equals T$_1$, that the current time (as observed or obtained by the content server 104a) is T$_2$, and that the period of engagement of the client device 102a is equal to T$_2$–T$_1$. The content server 104a may send a response 128 to the request 124, and the response 128 may include the second playlist, as well as a LastSeen value that has been updated to indicate the current time T$_2$. In response to receiving the second playlist, the client device 102a may be able to identify and request one or more fragments described in the second playlist (indicated in the example illustrated in FIG. 1 by ellipses). As noted above, the content server 104a may respond to such requests by sending the fragments to the client device 102a without sending any updated cookie information.

The client device 102a may send a request 130 to the content server 104a for a third playlist (e.g., Playlist$_3$). For example, the client device 102a may have downloaded all or most of the fragments identified in the second playlist and may request the third playlist to continue streaming the live media content. The client device 102a may send the request 130 with the SessionID value received from the content server 104a in the response 110 and the LastSeen value received from the content server 104a in the response 128 (e.g., T$_2$). Similar to the operations 126 described above, in response to receiving the request 130, the content server 104a may determine that the request 130 is a request for a playlist and that the request 130 was received with both a SessionID value and a LastSeen value, in operations 132. As part of performing the operations 132, the content server 104a may determine that the LastSeen value is equal to T$_2$, that the current time is equal to T$_3$, and may add the difference between the time T$_3$ and the time T$_2$ to the period of engagement determined in the operation 126. By continually updating the period of engagement based on subsequent requests for playlists that are received from the client device 102a, the content server 104a may be able to track the overall amount of time that the client device 102a downloaded or was engaged with the media content as measured by subsequent request for playlists. The content server 104a may send a response 134 to the client device 102a that includes the third playlist, as well as a LastSeen value that is based on the time T$_3$.

In some embodiments, the content server 104a may adjust the period of engagement associated with the client device 102a in the event that there is an unexpected delay before the client device 102a requests a subsequent playlist. For example, after receiving the third playlist in the response 134, the client device 102a may not send a request for a fourth playlist for an unexpectedly long period of time. In such an example, the content server 104a may expect client devices to send a request for the next playlist within a threshold period of time, such as an amount of time needed to present the fragments to the user within a certain margin of error (e.g., the time to display plus or minus ten seconds). In such embodiments, when calculating the difference between a LastSeen value included in a request for a playlist and a current time, the content server 104a may determine whether the difference exceeds a threshold amount of time, which may reflect a maximum expected period of time between playlist requests. A difference that exceeds this threshold amount of time may indicate that the client device 102a suspended or was unable to continue downloading the media content for some duration of time. In response to determining that the difference exceeds the threshold, the content server 104a may calculate the period of engagement associated with the client device 102a as described above and may adjust the period of engagement to remove the period of time in which the client device 102a was unable to download the live media content or the period of time the client device 102a suspended download of the live media content. In response to determining that the difference does not exceed the threshold, the content server 104a may calculate the period of engagement without adjustment.

Figure 2:
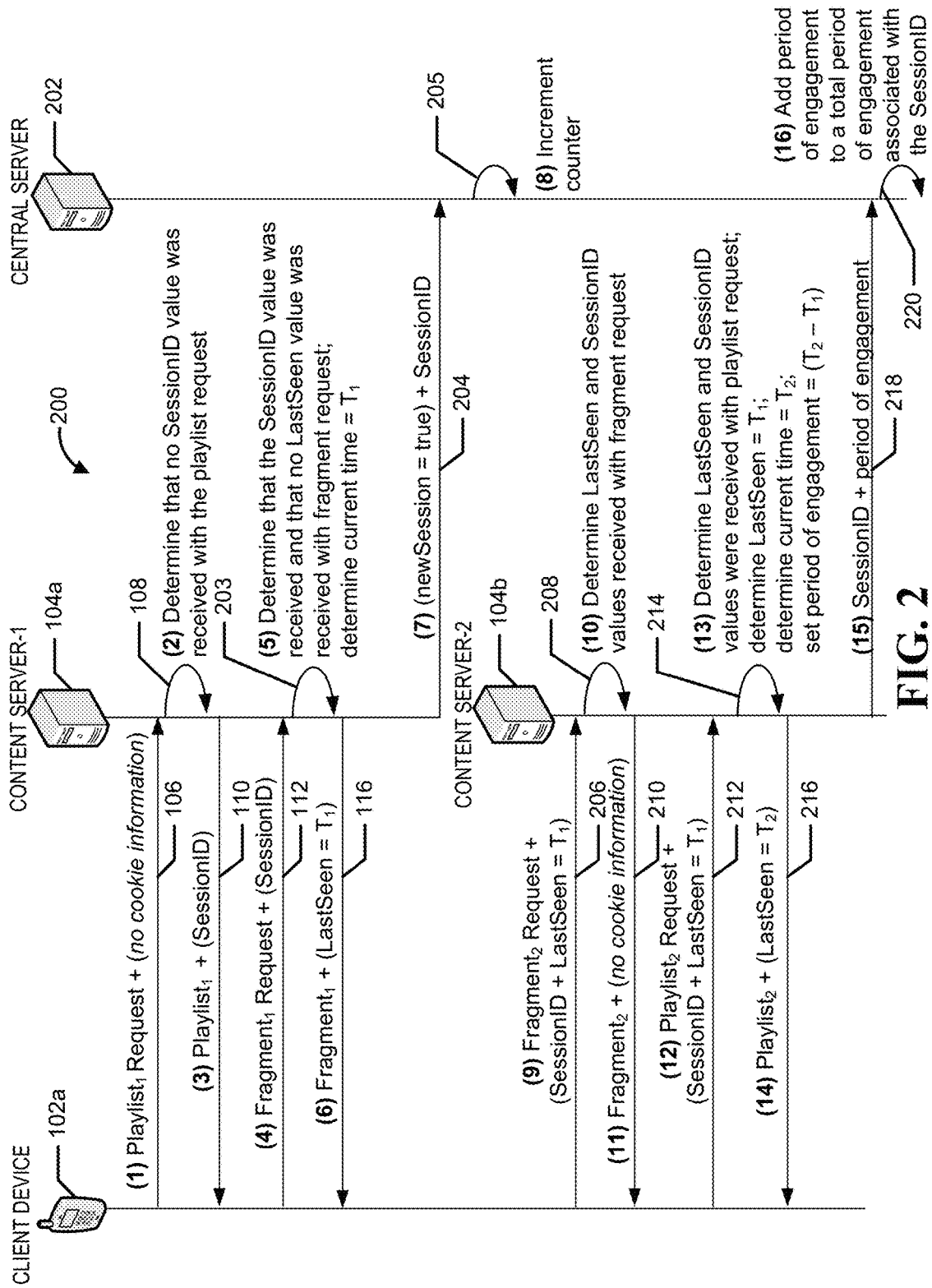
FIG. 2 is a signal and call flow diagram of communications exchanged between a client device, multiple content servers, and a central server, according to some embodiments.

FIG. 2 is a signal and call flow diagram that illustrates a system 200 suitable for implementing some aspects of the present disclosure. In the example illustrated in FIG. 2, the system 200 may include the client device 102a, the content server 104a, another content server 104b, and a central server 202. In some embodiments, the content server 104b may be configured similarly to the content server 104a as described with reference to FIG. 1. Thus, each of the content servers 104a and 104b may be configured to receive requests for fragments and playlists from the client device 102, determine whether the requests are received with cookie or stateful information, and respond to the requests with fragments, playlists, and updated cookie information.

The system 200 may further include a central server 202, which may be in communication with the content servers 104a and 104b. In some embodiments, the central server 202 may coordinate, compile, or determine media engagement information for client devices (e.g., the client device 102) based on information received the content servers 104a and 104b. For example, the central server 202 may receive different media engagement information related to the client device 102a from each of the content servers 104a and 104b. In response, the central server 202 may compile the different media engagement information to determine or calculate an overall media engagement information associated with the client device 102a.

In the example illustrated in FIG. 2, the client device 102a and the content server 104a may exchange communications and perform operations similar to some of the communications and operations described with reference to the example illustrated in FIG. 1. For instance, the client device 102a may make send the request 106 for a first playlist of the media content to the first content server 104a. The content server 104a may determine in the operation 108 that the request 106 was not received with a SessionID value, and in response, the content server 104a may send the response 110 that includes the first playlist and a SessionID value to the client device 102. The client device 102a may further send the request 112 for a first fragment of the media content, as well as the SessionID value received with the response 110, to the client server 104a.

In the operation 203, the content server 104a may determine that the request 112 was received with a SessionID value but was not received with a LastSeen value. The content server 104a may also determine the current time (e.g., $T_1$), as described above. The content server 104a may then send the response 116 that includes the first requested fragment and a LastSeen value based on the current time (e.g., LastSeen=$T_1$).

Based on the presence of the SessionID value and the absence of the LastSeen value, the content server 104a may determine that the client device 102a is downloading the media content for the first time (e.g., is starting a new media session). The content server 104a may then send a communication 204 to the central server that includes media engagement information related to the client device 102 that indicates that a new session of the media content (e.g., "newSession=true") has occurred. In some embodiments, the communication 204 may also optionally include the SessionID value associated with the new media session initiated by the client device 102a, for example, to enable the central server 202 to maintain individual metrics, statistics, or other information uniquely associated with the client device 102a. In some embodiments, the central server 205 may increment a counter, which may represent a number of unique client devices that have downloaded at least one fragment of the media content.

Subsequent to receiving the response 116 from the content server 104a, the client device 102a may request fragments or playlists for media content from one of a plurality of content servers. For instance, while the client device 102a sent the request 106 for the first playlist and the request 112 for the first fragment of media content to the content server 104a, the client device 102a may send a request 206 for the second fragment of media content to the content server 104b, along with the SessionID value and the LastSeen value received from the content server 104a in the responses 110 and 116, respectively.

In operation 208, the content server 104a may determine that request 206 was received with a SessionID value and a LastSeen value. In particular, by determining that the client device 102a is requesting a fragment of media and that the client device 102a has already received a SessionID value and a LastSeen value, the content server 104b may determine that the client device 102a has already been "counted" as a new or unique computing device. As a result, the content server 104b may send the requested fragment of media content to client device 102 without sending new or updated cookie information.

In some optional embodiments, the media content may be a live stream of media, which may require the client device 102a to download multiple playlists, as described above. In the example illustrated in FIG. 2, the client device 102a may send a request 212 for a second playlist of the media content to the content server 104b, such as just before the client device 102a finishes presenting the fragments already downloaded on the client device 102a to the user. The request 212 may include or may otherwise be sent in conjunction with the SessionID value and the LastSeen value received in the responses 110 and 116 from the contents server 104a.

The content server 104b may, in operation 214, determine that the request 212 is a request for a playlist. The content server 104b may also determine that the request 212 was received with a LastSeen value and a SessionID value. In response to determining that the request 212 was a request for a playlist and that the request 212 was received with both a SessionID value and a LastSeen value, the content server 104b may determine a current time (e.g., $T_2$), determine a time associated with the LastSeen value received in the request 212 (e.g., $T_1$), and calculate a period of engagement based on the different between the current time and the time associated with the LastSeen value (e.g., $T_2-T_1$).

Thus, by storing the SessionID value and the LastSeen value received from the content server 104a as described above, the client device 102a may communicate these values to the content server 104b in addition to the content server 104a. The content server 104b may be informed of the current state of the client device 102—including whether the client device has made a previous request for a playlist or fragment of the media content—without having to have previously communicated with client device 102, the content server 104a, or the central server 202. As a result, the content server 104b may quickly and efficiently determine whether the client device 102a is downloading the media content for the first time or a period of time since the client device 102a last requested a playlist from a content server (e.g., $T_2-T1$) without coordinating with another server.

The content server 104b may send a response 216 to the client device 102, and the response 216 may include the second playlist that the client device 102a requested in the request 212. The response may also include an updated LastSeen value that is based on the current time calculated in the operation 214 (e.g., $T_2$).

Moreover, the content server 104b may send a communication 218 to the central server 202 that includes the SessionID value associated with the client device 102, as well as the period of engagement calculated in operation 214. In response, the central server 202 may add the period of engagement received in the communication 218 to a total period of engagement associated with the SessionID value received in the communication 204 from the content server 104a, in operation 220. In some embodiments (not shown), the central server 202 may receive one or more additional periods of engagement related to the same SessionID value from one or more content servers, and the central server 202 may continue adding these values to the total period of engagement associated with the SessionID. As such, the total period of engagement for the client device 102a may reflect the total amount of time that the client device 102a has been actively engaged in consuming the media content.

While the example illustrated in FIG. 2 includes one central server 202, more than one central server may be implemented in some embodiments. In such embodiments, the plurality of central servers may share various user engagement information (e.g., number of new media sessions, periods of engagements for one or more client devices) and may collectively determine overall user engagement information. For example, a first central server that supports one or more content servers may determine a total number of unique client devices that have downloaded the media content from those one or more content servers. Similarly, a second central server may support one or more other content servers and may determine a total number of unique client devices that have downloaded the media content from the one or more other content servers. The first and second central servers may then collectively determine a grand total number of unique client devices by sharing their respective totals and adding them together. In some instances, the sharing may be uni-directional (e.g., the first central server shares with the second central server but the second central server does not share with the first central server) or may be bi-directional.

Figure 3:
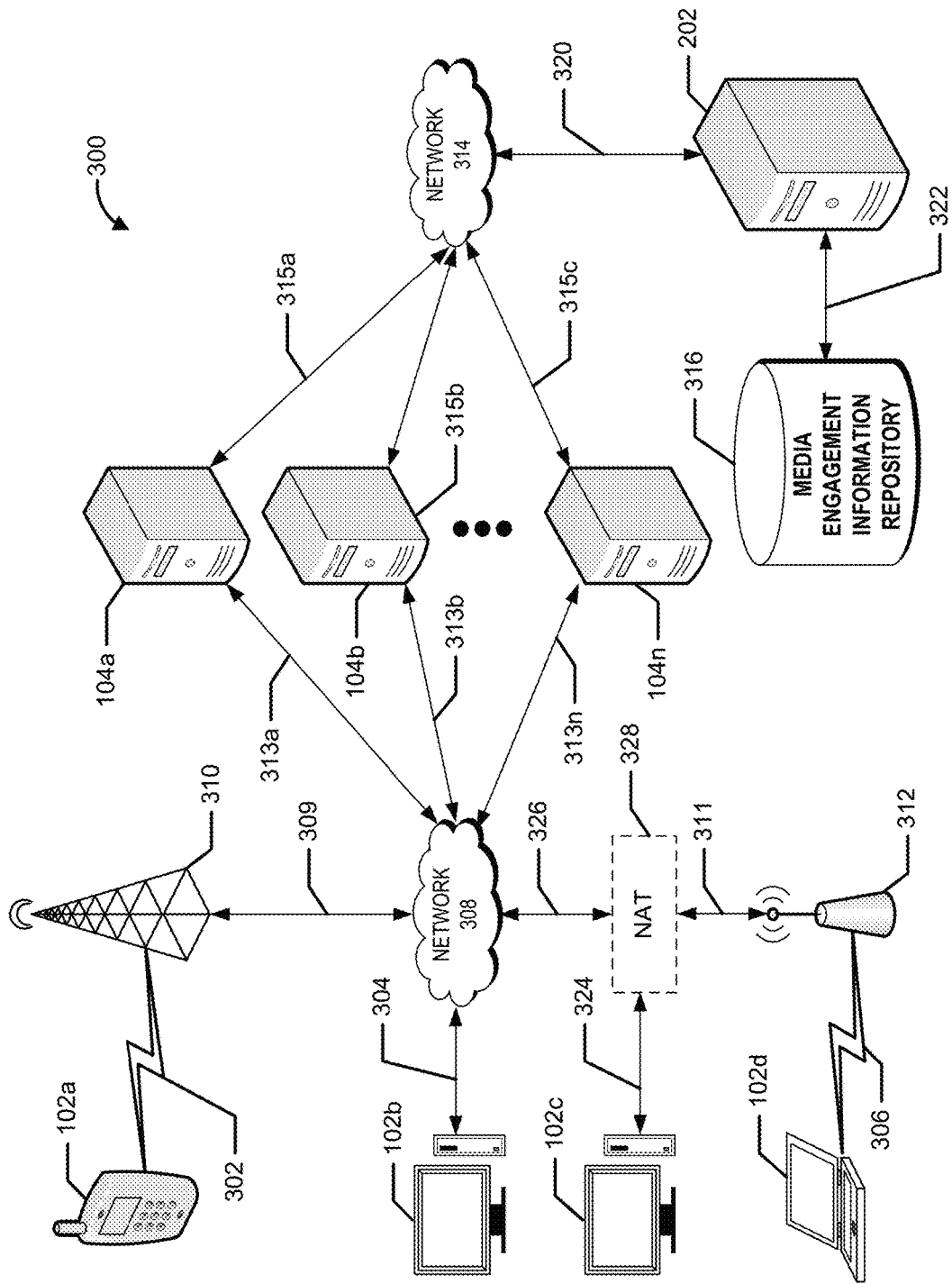
FIG. 3 is a communication system block diagram of a network suitable for use with some embodiments.

FIG. 3 is a functional block diagram of an illustrative system 300 suitable for implementing some aspects of the present disclosure. The system 300 may include one or more client devices, such as the client device 102a (e.g., as described with reference to FIGS. 1 and 2) and one or more optional client devices 102b-d, which may be similar to or different from the computing device 102a. In a non-limiting example, the client device 102a may be a mobile communication device, such as a smart phone or tablet, the client devices 102b-c may be desktop or personal computers, and the client device 102d may be a laptop computer. However, the client devices 102a-d may be any electronic computing device that is configured to stream media content by requesting one or more playlists and fragments of media content from one or more content servers, such as content servers 104-104n. For ease of description, system 300 is illustrated as including four client devices 102a-d. However, the system 300 may include one or more client devices without loss of scope.

In the system 300, the computing devices 102a-d may each communicate with one or more content servers 104a-104n by exchanging data and other information via a network 308. In an example, the computing device 102a may communicate over the network 308 via a cellular link 302 to a cellular base station 310 that may maintain a wired link 309 to the network 308. The computing devices 102b-c may send communications directly to the network 308 via wired links 304, 324, or 326. The computing device 102d may communicate through the network 308 via a wireless connection 306 to a wireless access point 312 (e.g., a wireless router) that communicates with the network 308 via one or more of the wired links 311 and 326.

In some embodiments, the network 308 may route or forward requests for fragments and playlists of media content from the client devices 102a-d to the content server 104a (e.g., as described with reference to FIGS. 1 and 2) and, optionally, to one or more of the content servers 104b-n via communication links 313a-313n, respectively. In some embodiments, the one or more content servers 104b-104n may each be similar to or different from the content server 104a. As such, the one or more content servers 104a-n may receive and respond to requests for fragments and playlists of media content from the one or more of the client devices 102a-d. The one or more content servers 104a-n may also be configured to send cookie or other stateful information (e.g., SessionID and LastSeen values) to the one or more client devices 102a-d via the network 308.

In some embodiments (e.g., as described with reference to the example illustrated in FIG. 1), each of the client devices 102a-d may send requests for fragments and playlists of media content to one of the content servers 104a-n and may receive media content fragments and playlists, as well as cookie information, from that content server. For example, the client device 102a may have a dedicated connection to the content server 104a such that the client device 102a sends media content requests and cookie information only to the content server 104a. In this example, the content server 104a may be able to determine and record all of the media engagement information related to the consumption of media content by the client device 102a. As a result, the content server 104a may determine when the client device 102a has initiated a new session of viewing/consuming the media content or, in some embodiments, a period of engagement related to how long the client device 102a has been actively consuming live media content.

In some embodiments in which one or more of client devices 102a-d make media-content-related requests to multiple content servers 104a-n (e.g., as described with reference to the example illustrated in FIG. 2), the content servers 104a-n may determine only a portion of the media engagement information associated with the client devices 102a-n, such as when each of the client devices 102a-n establishes a new media session or a period of time that has elapsed since each of the client devices 102a-n made a last request for a playlist of live media content. In order to compile the portions of media engagement information, the content servers 104a-n may send respective portions of media engagement information related to the client devices 102a-n to the central server 202, such as by sending indications of new sessions over a network 314 via wired connections 315a-c.

The central server 202 may receive media engagement information from one or more of the content servers 104a-n over the network 314 via a wired connection 320. In some embodiments, the media engagement information may include information regarding new media sessions, such as a number of unique client devices or new media sessions that each of the content servers 104a-n have identified. The media engagement information may additionally, or alternatively, include information regarding how long each particular client device has been actively engaged in consuming live media content based on a time period between requests for media playlists. The central server 202 may compile media engagement information for each SessionID value or for all SessionID values (e.g., a total number of unique client devices that have downloaded a part of the media content). The compiled media engagement information may be stored locally on the central server 202 or, optionally, in a media engagement information repository 316 in communication with the central server 202 over a link 322.

In some optional embodiments, the system may include a network address translation device (illustrated in FIG. 3 as "NAT" 328). The NAT 328 may receive various communications from multiple client devices and may translate the addresses of those communications such that the communications from multiple client devices may appear to be coming from one or more Internet Protocol (IP) addresses. In the example illustrated in FIG. 3, the NAT 328 may be in communication, directly or indirectly, with the client devices 102c-d via a direct wired data link 324 to the client device 102c or via a wired data link 311 to the wireless access point 312. The NAT 328 may receive requests for media fragments and playlists addressed to one or more of the content servers 104a-n from one or both of the client devices 102c-d. In response to receiving these media-related requests, the NAT 328 may translate or map the source addresses of the requests from addresses of the client devices 102c-d to one or a few IP addresses. The NAT 328 may forward the requests with the modified addresses to the one or more content servers 104a-n. Because the NAT 328 maps or translates the addresses for the requests, the one or more content servers 104a-n may be unable to identify each individual client device that is requesting media content based on the source IP addresses associated with the requests because multiple client devices will appear to have the same IP address.

In the event that the computing devices 102c-d behind the NAT 328 support cookies, the content servers 104a-n may be able to identify the client devices 102c-d based on the cookie information (e.g., SessionID values) that the client devices 102c-d send with their media requests. Moreover, the one or more content servers 104a-n may utilize the cookie information to determine media engagement information related to the client devices 102c-d, such as when those client devices 102c-d start a new media session, how long the client devices 102c-d engage live media content, and other engagement information discussed above.

In the event that the computing devices 102c-d do not support cookies, the content servers 104a-n may be unable to use cookie information to identify the client devices 102c-d. Further, because the NAT 328 may cause requests from the client devices 102c-d to appear to be coming from one IP address, the one or more content servers 104a-n may be unable determine the media requests from the client devices 102c-d are coming two separate devices and thus may be unable to determine a total number of unique client devices that are downloading the media content. However, in some embodiments in which the media content is live, the one or more content servers 104a-n and the central 202 may estimate the number of unique client devices that are downloading live media content based on a number of parallel downloads of the live media content that are associated with the same IP address. For example, since both of the client devices 102c-d may be downloading the live media content, the one or more content servers 104a-n or the central server 202 may determine that there are two unique client devices downloading the live media content because two separate requests for the live media content are being received concurrently or in parallel. Estimating the number of unique client devices in these circumstances is as further described with reference to FIG. 9.

In some embodiments (not shown), one or more of the client devices 102a-d may sent requests to one or more of the content servers 104a-n through one or more proxy servers. In such embodiments, the one or more proxy servers may receive the requests from the one or more client devices 102a-d and may forward these requests to one or more of the content servers 104a-n. Similarly, the one or more proxy servers may receive responses from the one or more content servers 104a-n and may forward those responses to the appropriate client device 102a-d.

The networks 308 and 314 may be any wired network, wireless network, or combination thereof. In addition, the networks 308 and 314 may be a personal area network, local area network, wide area network, cable network, satellite network, cellular telephone network, etc. or combination thereof. In addition, the networks 308 and 314 may be a personal area network, local area network, wide area network, over-the-air broadcast network (e.g., for radio or television), cable network, satellite network, cellular telephone network, or combination thereof. For example, the network 308 may be a publicly accessible network of linked networks, possibly operated by various distinct parties, such as the Internet. In some embodiments, the networks 308 and 314 may be private or semi-private networks, such as a corporate or university intranets. The networks 308 and 314 may include one or more wireless networks, such as a Global System for Mobile Communications (GSM) network, a Code Division Multiple Access (CDMA) network, a Long Term Evolution (LTE) network, or some other type of wireless network. The networks 308 and 314 may use protocols and components for communicating via the Internet or any of the other aforementioned types of networks. Protocols and components for communicating via the Internet or any of the other aforementioned types of communication networks are well known to those skilled in the art and, thus, are not described in more detail herein.

Figure 4B:
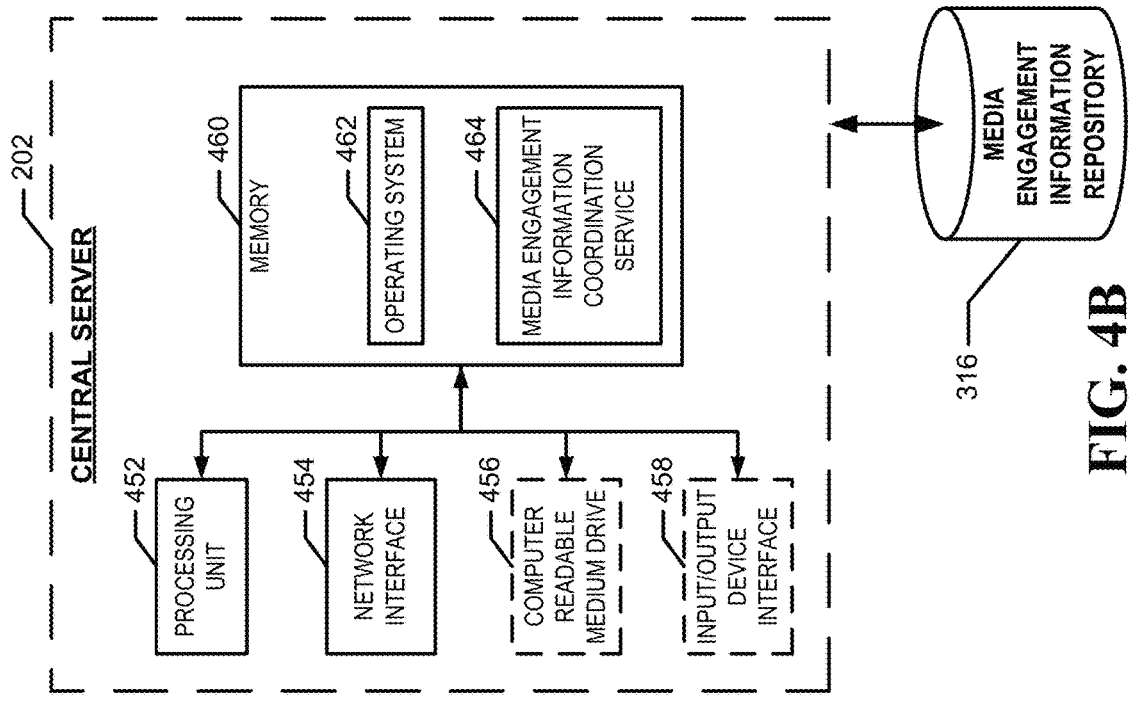
FIG. 4B is a component diagram of an example central server suitable for use with some embodiments.
Figure 4A:
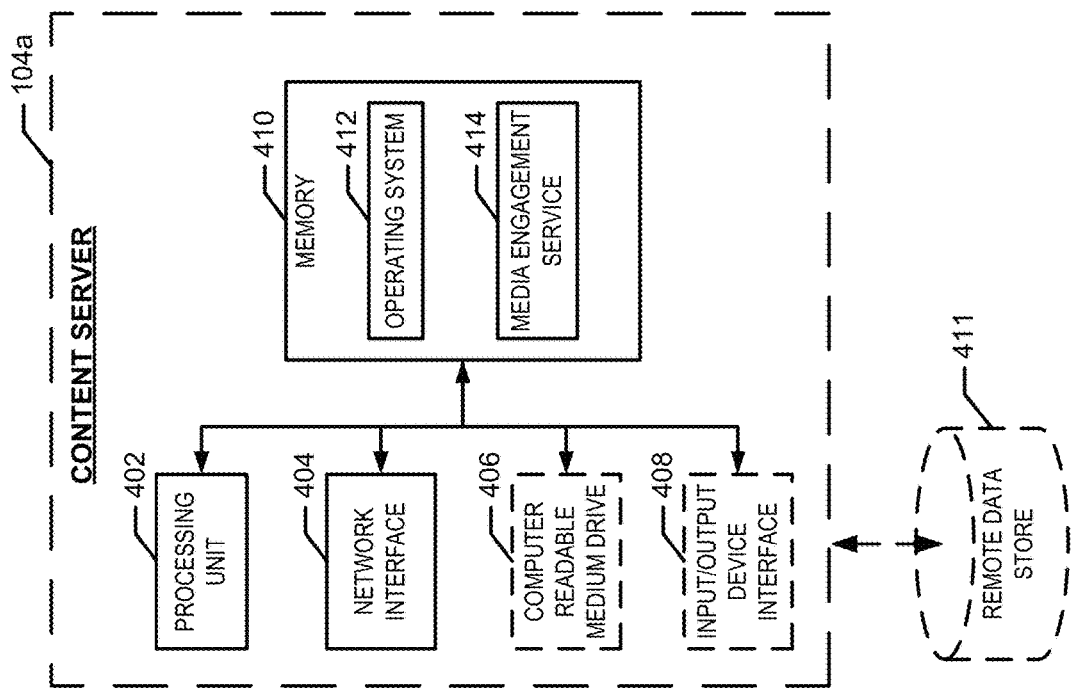
FIG. 4A is a component diagram of an example content server suitable for use with some embodiments.

FIG. 4A depicts a general architecture of the content server 104a, which—as described above with reference to FIGS. 1-3—may be configured to respond to requests for media content received from client devices and to determine or estimate media engagement information related to those client devices. The general architecture of the content server 104a depicted in FIG. 4A includes an arrangement of computer hardware and software components that may be used to implement aspects of the present disclosure. The content server 104a may include many more (or fewer) elements than those shown in FIG. 4A. It is not necessary, however, that all of these generally conventional elements be shown in order to provide an enabling disclosure.

As illustrated, the content server 104a includes a processing unit 402, a network interface 404, a computer readable medium drive 406, and an input/output device interface 408, all of which may communicate with one another by way of a communication bus. The network interface 408 may provide connectivity to one or more networks (e.g., the networks 308 and 314) or computing systems and, as a result, may enable the content server 104a to receive and send information and instructions from and to other computing systems or services. For example, the content server 104a may receive requests for media content from one or more client devices with the network interface 404, and the processing unit 402 may, in response, send media content, cookie or stateful information, or other information and data to the requesting client devices over a network using the network interface 404.

The processing unit 402 may also communicate to and from memory 410. The memory 410 may contain computer program instructions (grouped as modules or components in some embodiments) that the processing unit 402 may execute in order to implement one or more embodiments. The memory 410 generally includes RAM, ROM, and/or other persistent, auxiliary, or non-transitory computer-readable media. The memory 410 may store an operating system 412 that provides computer program instructions for use by the processing unit 402 in the general administration and operation of the content server 104a. The memory 410 may further include computer program instructions and other information for implementing aspects of the present disclosure. For example, in some embodiments, the memory 410 may include a media engagement service 414, which may be executed by the processing unit 402 to perform various operations, such as those operations described with reference to FIGS. 1-3 and 5-9. In some embodiments, the media engagement service 414 may implement various aspects of the present disclosure. For example, the media engagement service 414 may process requests for fragments and playlists of media content from one or more client devices by identifying cookie information included in the requests, determining media engagement information based on cookie information included in the requests, sending updated cookie information to the one or more client devices, and, optionally, reporting a portion of all of the cookie information to a central server for compilation with other media engagement information associated with the same media content or with the same one or more client devices accessing the media content. In some embodiments, the media engagement service 414 may also, or alternatively, identify one or more client devices that do not or cannot support cookie information, and in such embodiments, the media engagement service 414 may estimate the number of those client devices that are streaming live media content by monitoring the number of parallel or concurrent downloads of the live media content.

While the media engagement service 414 is illustrated as a distinct module in the memory 410, in some embodiments, the media engagement service 414 may be incorporated as a module in the operating system 412 or another application or module, and as such, a separate media engagement service 414 may not be required to implement some embodiments. In some embodiments, the media engagement service 414 may be implemented as part of a common web service (e.g., an HTTP web service) and may support one or more streaming protocols.

Further, in some embodiments, the above description of the content server 102*a* may also be applied to various other content servers, such as the one or more content servers 102*b-n* (e.g., as described with reference to FIG. 2 or 3). In such embodiments, the one or more content servers 102*b-n* may include the components discussed above and may be configured to perform operations described with reference to the various embodiments.

FIG. 4B depicts a general architecture of the central server 202, which—as described above with reference to FIGS. 2-3—may be configured to coordinate or compile media engagement information received from one or more of the content servers 104*a*-104*n*. As described with reference to the content server 104*a*, the general architecture of the central server 202 depicted in FIG. 4B includes an arrangement of computer hardware and software components that may be used to implement aspects of the present disclosure, and the central server 202 may include more or fewer elements than those shown in FIG. 4B. In particular, it is not necessary for all of these elements be shown in order to provide an enabling disclosure.

As illustrated, the central server 202 includes a processing unit 452, a network interface 454, a computer readable medium drive 456, and an input/output device interface 458, all of which may communicate with one another by way of a communication bus. The network interface 458 may provide connectivity to the one or more content servers 104*a-n*, such as via the network 314, thereby enabling the central server 202 to receive media engagement information from one or more of the content servers 104*a-n*

The processing unit 452 may also communicate to and from memory 460. The memory 460 may contain computer program instructions (grouped as modules or components in some embodiments) that the processing unit 452 may execute in order to implement one or more embodiments. The memory 460 may include one or more types of memory, such as RAM, ROM, and/or other persistent, auxiliary or non-transitory computer-readable media. The memory 410 may store an operating system 462 that provides computer program instructions for use by the processing unit 462 in the general administration and operation of the central server 202. The memory 460 may further include computer program instructions and other information for implementing some aspects of the present disclosure. For example, in some embodiments, the memory 460 may include a media engagement information coordination service 464, which may be executed by the processing unit 462 to perform operations, such as those operations described with reference to FIGS. 2-3. In some embodiments, the media engagement information coordination service 464 may implement some aspects of the present disclosure. For example, the media engagement information coordination service 464 may receive media engagement information from one or more of the content servers 104*a-n* and, based on that media engagement information, may determine various aspects of how media content was consumed, such as the number of unique devices that downloaded at least one fragment of the media, an average amount of time that client devices engaged the media content, an amount of time that individual client devices engaged the media content, as well as various other metrics, statistics, and other information regarding client devices' consumption of the media content.

While the media engagement information coordination service 464 is illustrated as a distinct module in the memory 460, in some embodiments, the media engagement information coordination service 464 may be incorporated as a module in the operating system 462 or another application or module (not shown), and as such, a separate media engagement information coordination service 464 may not be required to implement some embodiments.

Figure 5:
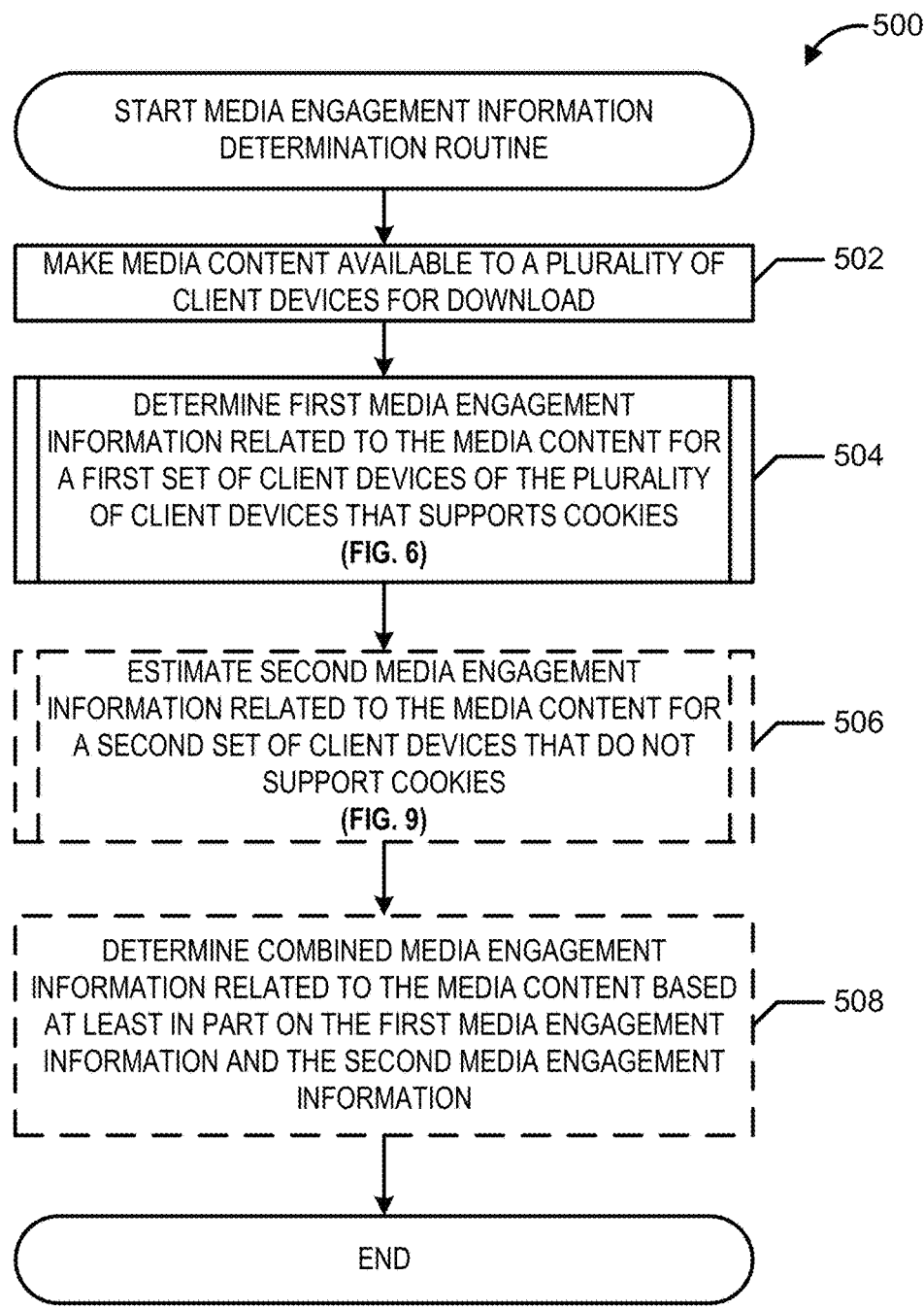
FIG. 5 is a process flow diagram illustrating a computer-implemented method for determining media engagement information for client devices that support cookies and for client devices that do not support cookies, according to some embodiments.

FIG. 5 is a process flow diagram of an illustrative routine 500 for calculating media engagement information of media content, according to some embodiments. The routine 500 may be implemented with a media engagement service operating on a content server (e.g., the media engagement service 414 of the content server 104*a* as described with reference to FIG. 4A).

In block 502, the media engagement service 414 may make media content available to a plurality of client devices for download, such as by hosting the media content on a website or some other network-accessible location. In an example, fragments of the media content may be stored in one or more network folders that may be accessed by the client devices.

The media engagement service 414 may determine first media engagement information related to the stream of media, in block 504. In particular, the first media engagement information may be related to a first set of the plurality of client devices that support cookies or other stateful information.

In some embodiments of the operations performed in block 504, the media engagement service 414 may determine media engagement information related to the number of unique client devices in the first set of client devices that have downloaded at least a portion of the media content. For example, the media engagement service 414 may determine the number of client devices that send requests for a fragment of media content with a SessionID value and without a LastSeen value.

In some optional embodiments, the media engagement service 414 may receive a request for a playlist file for live media content from a client device. The media engagement service 414 may utilize a LastSeen value included in the playlist request to determine an amount of time that the client device in the first set has engaged live media content. For instance, the media engagement service 414 may subtract the time represented by the LastSeen value from a current time to determine a period of time since the client device last playlist request. The media engagement service 414 may also determine the total period of time that the client device engaged the live media content adding up all of the periods of time between the client device's requests for playlists. Similarly, the media engagement service 414 may determine the total, average, or other useful statistical information about the overall period of engagement for the client devices in the first set. The operations for determining the first media engagement information related to the first set of client devices is further described with reference to subroutine 600 of FIG. 6.

In optional block 506, the media engagement service 414 may estimate second media engagement information related to the stream of media, and such second media engagement information may be related to a second set of client devices of the plurality of client devices that do not support cookies or stateful information. Because client devices in the second set do not support cookie information, the media engagement service 414 may be unable to use cookie information to determine the number of unique client devices included in the second set, as described with reference to the operations performed in block 504. In some embodiments, the media engagement service 414 may identify client devices that request fragments of content without providing a SessionID as not supporting cookies, and the media engagement service 414 may record or otherwise designate those client devices as not supporting cookie information. In an example, the media engagement service 414 may document the client devices that do not support cookie information based on the IP addresses associated with requests for fragments of live media content that do not include a SessionID value. In another example, the media engagement service 414 may identify these client devices based on a combination of IP address and one or more other identifying characteristics, such as characteristics identified in user agent information received with the requests.

In embodiments in which the media content is live, the media engagement service 414 may monitor how many parallel downloads of live media content are associated with each unique IP address (or combination of IP address and user agent information). The media engagement service 414 may then estimate the number of actual client devices that downloaded the live media content based on the number of parallel downloads associated with each unique IP address or combination of IP address and user agent. Estimating the second media engagement information for the second set of client devices is further described with reference to subroutine 900 of FIG. 9.

In optional block 508, the media engagement service 414 may optionally determine combined media engagement information related to the media content based at least in part on the first media engagement information determined in block 504 and the second media engagement information estimated in block 506. For example, the media engagement service 414 may add the number of unique client devices in the first set of client devices (e.g., as determined in block 504) with an estimate of the number of unique client devices in the second set of client devices (e.g., as estimated in block 506) to determine a total number of unique client devices that downloaded or otherwise engaged the media content.

Subsequent to determining the combined media engagement information in block 508, the media engagement service 414 may terminate the routine 500.

The operations of the routine 500 may be performed by a media engagement service on a single content server, such as on the media engagement service 414 on content server 104a described above. However, in some embodiments, the operations of the routine 500 may be performed on one or more content servers operating in conjunction with a media engagement information coordination service on a central server (e.g., the media engagement information coordination service 464 of the central server 202 as described with reference to FIG. 4B). Such embodiments are described further, for example, in context of subroutines 600-900 of FIGS. 6-9.

Figure 6:
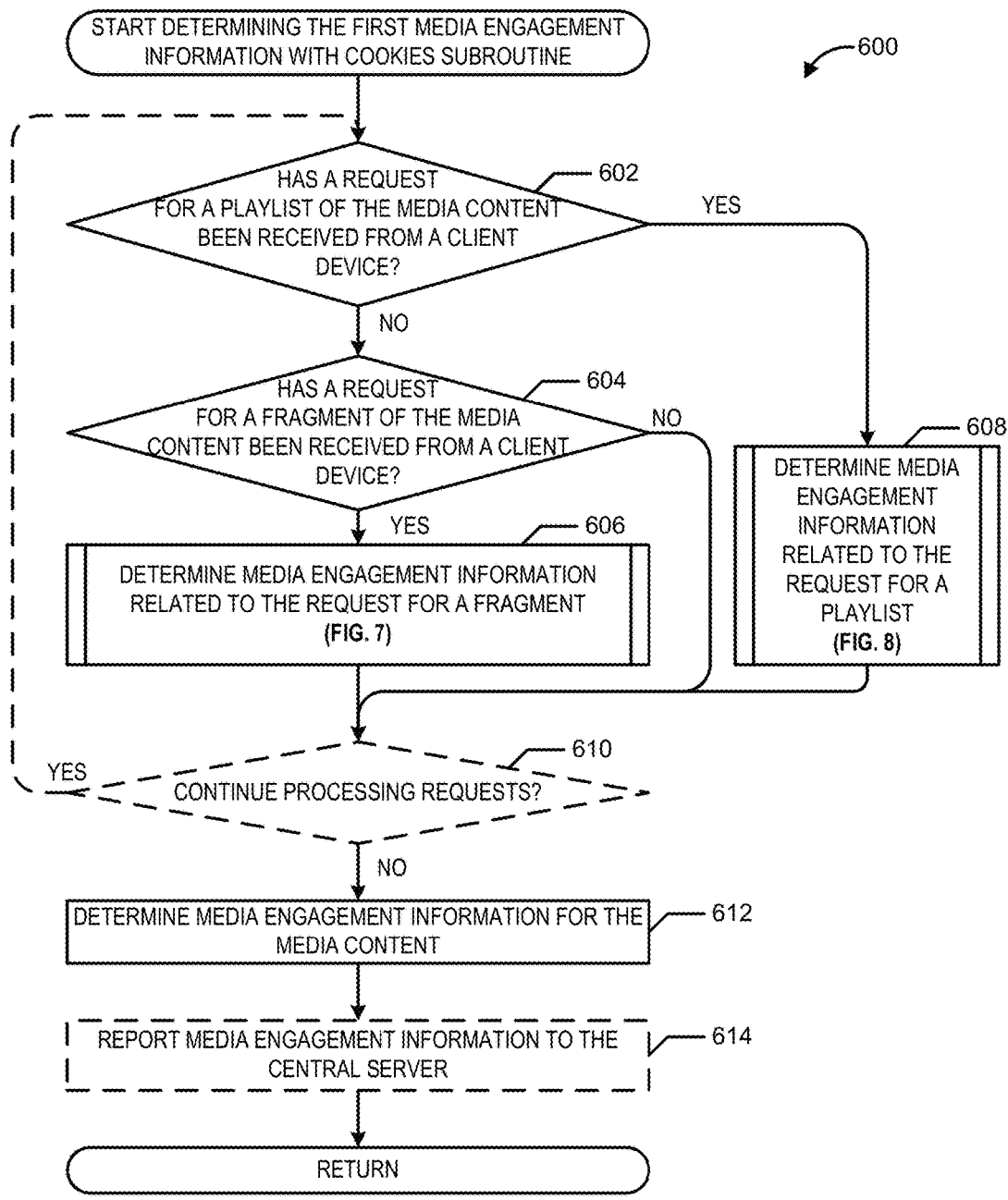
FIG. 6 is a process flow diagram illustrating a computer-implemented method for determining media engagement information for client devices that support cookies, according to some embodiments.

FIG. 6 is a process flow diagram of an illustrative subroutine 600 for determining the first media engagement information for client devices that support cookies, according to some embodiments. The subroutine 600 may be implemented with a media engagement service operating on a content server (e.g., the media engagement service 414 of the content server 104a as described with reference to FIG. 4). The subroutine 600 implements an embodiment of the operations of block 504 of the routine 500 as described with reference to FIG. 5. As such, the media engagement service 414 may begin performing the operations of the subroutine 600 subsequent to making the media content available in block 502 of the routine 500.

In decision block 602, the media engagement service 414 may determine whether a request for a playlist of the media content has been received from a client device. As described, a client device may be required to first download a playlist for media content before the client device is able to download fragments of the media content. In response to determining that a playlist request has been received from a client device (i.e., decision block 602="YES"), the media engagement service 414 may determine media engagement information related to the playlist request, in block 608. For example, the media engagement service 414 may determine that the client device is requesting another playlist for live media content request, and the media engagement service 414 may calculate or update a period of engagement associated with the client device based on a LastSeen value included with the request for the playlist. Determining media engagement information related to a request for a playlist that is received from a client device is further described with reference to subroutine 800 of FIG. 8.

In response to determining that a playlist request has not been received from a client device (i.e., decision block 602="NO"), the media engagement service 414 may determine whether a request for a fragment of the media content has been received from a client device, in decision block 604. In response to determining that a fragment request has been received from a client device (i.e., decision block 604="YES"), the media engagement service 414 may determine media engagement information related to the fragment request, in block 606. In some embodiments of the operations performed in block 606, the media engagement service 414 may determine the fragment request was received with a SessionID value but without a LastSeen value, thereby indicating that the client device is initiating a new session of streaming the media content. As a result, the media engagement service 414 may increment a counter that indicates a number of unique client devices that have downloaded at least a portion of the media content. Determining media engagement information related to a fragment request is further described with reference to subroutine 700 of FIG. 7.

In response to determining that a fragment request has not been received from a client device (i.e., decision block 604="NO"), in response to processing the request for a fragment in block 606, or in response to processing the request for a playlist in block 608, the media engagement service 414 may optionally determine whether to continue processing requests in optional decision block 610. For instance, the media engagement service 414 may continually process requests related to live media content until the live media content has ended and is no longer available. The media engagement service 414 may determine to stop processing requests (i.e., optional decision block 610="NO") in response to determining that a request from a fragment or a playlist of the media content has not been received in a threshold period of time. For example, in the event that no request for the media content has been received (i.e., decision block 604=NO") for ten seconds. In response to determining to continue processing requests (i.e., optional decision block 610="YES"), the media engagement service 414 may repeat the above operations in a loop by again determining whether a request for playlist of the media content has been received from a client device in decision 602.

In response to determining not to continue processing requests (i.e., optional decision block 610="NO"), the media engagement service 414 may determine media engagement information for the media content, in block 612. For example, based on the media engagement information determined in blocks 606 and 608, the media engagement service 414 may determine a total number of unique client devices that downloaded at least a portion of the media content, for example, by counting the number of new sessions determined in block 606, determine an average amount of time that client devices engaged the media by adding the periods of engagement for each of the unique client devices and dividing the number of unique client devices, and determine various other statistic related to consumption of the media content.

In some optional embodiments in which client devices are able to request fragments and playlists from two or more content servers, the media engagement service 414 may optionally report the media engagement information to a central server (e.g., the central server 202 as described with reference to FIG. 2). In such optional embodiments, the media engagement information determined in block 612 may only include a portion of the total media engagement information related to the media content because media requests may have been distributed among the two or more content servers. As a result, the media engagement service 414 may send the portion of the total media engagement information that the media engagement service 414 determined in block 612 to the central server 202. The content server 202 may perform operations (not shown) to combine the portions of the total engagement information received from the media engagement service 414 and one or more other content servers to generate the total engagement information for the media content. For example, each content server may send a separate number of unique client devices to the central server 202, and the central server 202 may add these numbers to determine a total number of unique client devices that downloaded at least a portion of the media content. Similarly, in another example, the content servers may each calculate separate periods of engagement related to a client device, associate those periods of engagement with the client device's SessionID value, and send the period of engagement with the client device's SessionID value to the central server. The central server may then add all of the periods of engagement associated with the client device's SessionID value to determine the total amount of time that the client device was engaged with/downloaded live media content.

The media engagement service 414 may end the subroutine and return to performing operations in the routine 500 as described (e.g., with reference to FIG. 5).

Figure 7:
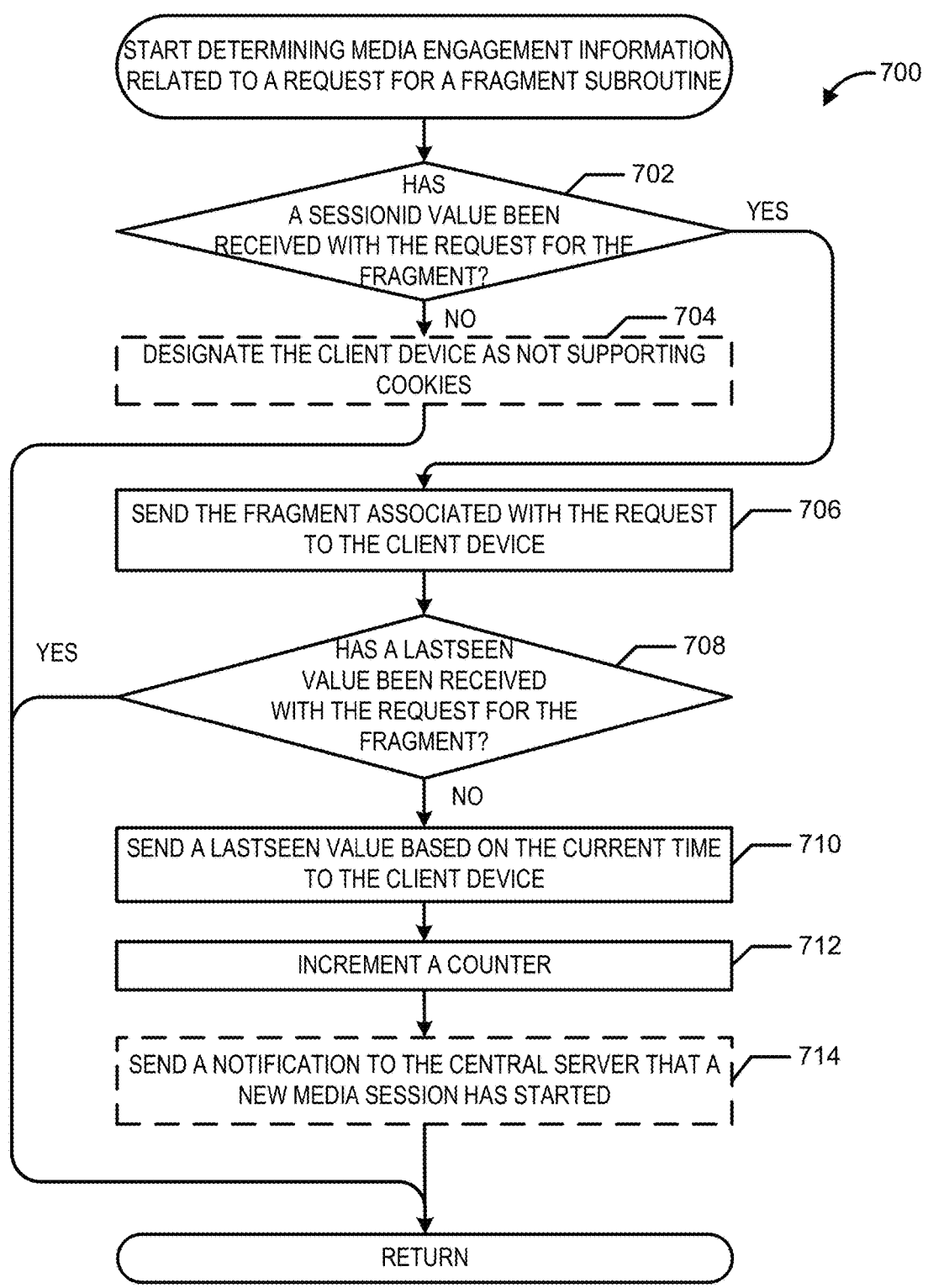
FIG. 7 is a process flow diagram illustrating a computer-implemented method for determining media engagement information related to a request for a fragment of media content, according to some embodiments.

FIG. 7 is a process flow diagram of an illustrative subroutine 700 for determining media engagement information related to a request for a fragment of media content, according to some embodiments. The subroutine 700 may be implemented with a media engagement service operating on a content server (e.g., the media engagement service 414 of the content server 104a as described with reference to FIG. 4). The subroutine 700 implements an embodiment of the operations of block 606 of the routine 600 as described with reference to FIG. 6. As such, the media engagement service 414 may begin performing the operations of the subroutine 700 in response to determining that a request for a fragment of the media content has been received from a client device in decision block 604 of the subroutine 600.

In decision block 702, the media engagement service 414 may determine whether a SessionID value has been received with the request for the fragment received from the client device. For example, the media engagement service 414 may determine whether the client device sent cookie information that includes the SessionID identifier, as well as a value associated with the SessionID identifier. The media engagement service 414 may receive the cookie information in the same communication as the request for the fragment or may receive the cookie information near in time to when the request for the fragment is received.

In response to determining that a SessionID value has not been received with the request for the fragment of media content (i.e., decision block 702="NO"), the media engagement service 414 may optionally designate the client device that requested the fragment of media content as not supporting cookies or other stateful information, in optional block 704. As described, client devices may be required to download a playlist for media content before the client devices are able to request fragments of the media content. Further, in response to a request for a playlist, the media engagement service 414 may send the playlist, as well as a SessionID value, to the requesting client device, such as in the form of cookie information. Thus, in the event that the media engagement service 414 receives a request for a fragment of media without a SessionID value, the media engagement service 414 may determine that the client device did not or could not store the cookie information that included the SessionID value.

In some embodiments of the operations performed in optional block 704, the media engagement service 414 may identify the client device. In an example, the media engagement service 414 may identify the client device based on the client device's IP address or based on a combination of the client device's IP address in addition to at least one other identifying characteristic (e.g., the browser application used to request the fragment). The media engagement service 414 may include the client device's identifying information in a list associated with client devices that do not or cannot support cookie information. In some embodiments (not shown), the media engagement service 414 may send this information to the central server 202, which may compile this list with other, similar lists sent from one or more other content servers.

In response to determining that a SessionID value has been received with the request for a fragment of media content (i.e., decision block 702="YES"), the media engagement service 414 may send the fragment associated with the fragment request to the client device, in block 706. In some embodiments, the media engagement service 414 may send the fragment to the client device according to one or more streaming protocols, including HLS or DASH.

In decision block 708, the media engagement service 414 may determine whether a LastSeen value has been received with the request for the fragment of media content, for example, by determining whether the client device has sent cookie information with the request and determining whether the cookie information includes a LastSeen identifier was a corresponding value.

In response to determining that a LastSeen value has not been received with the request for the media fragment (i.e., decision block 708="NO"), the media engagement service 414 may send a LastSeen value to the client device, in block 710. The media engagement service 414 may send the LastSeen value in the same communication used to send the fragment in block 706, or the media engagement service 414 may send the LastSeen value in a separate communication. In some embodiments, the LastSeen may be based on or equal to a current time determined or obtained by the content server 104. For example, the media engagement service 414 may request a current time from the central server 202, which may maintain a clock references by each of one or more content servers to ensure that the timings of one or more content servers are synchronized.

As described above, a request for a fragment of media content that is received with a SessionID value and without a LastSeen value may indicate that the requesting client device is initiating a new session of the media content. Thus, in block 712, the media engagement service 414 may increment a counter that indicates a number of unique client devices that have downloaded at least a portion of the media content because, in response to determining that the request for the fragment of media content was not received with a LastSeen value in decision block 708, the media engagement service 414 may determine that client device associated with the request is initiating a new media session.

In some optional embodiments, in addition to or instead of incrementing the counter in block 712, the media engagement service 414 may send a notification to the central server 202 that a new media session has started, in optional block 714. The central server 202 may receive these notifications from the media engagement service 414 and one or more other content servers for each new media session that is initiated. Based on these notifications, the central server 202 may determine the total number of unique client devices that have downloaded at least a portion of the media content. In an example, the central server 202 may simply count the number of notifications that were received from the media engagement service 414 and one or more other content servers to determine the total number of unique client devices.

In response to determining that a LastSeen value has been received with the request for the media fragment (i.e., decision block 708="YES"), or subsequent to optionally designating the client device as not supporting cookies in block 704 or incrementing the session counter in block 712, the media engagement service 414 may terminate operations of the subroutine 700 and may continue performing operations in the subroutine 600 by determining whether to continue processing requests in decision block 610 (e.g., as described with reference to FIG. 6).

Figure 8:
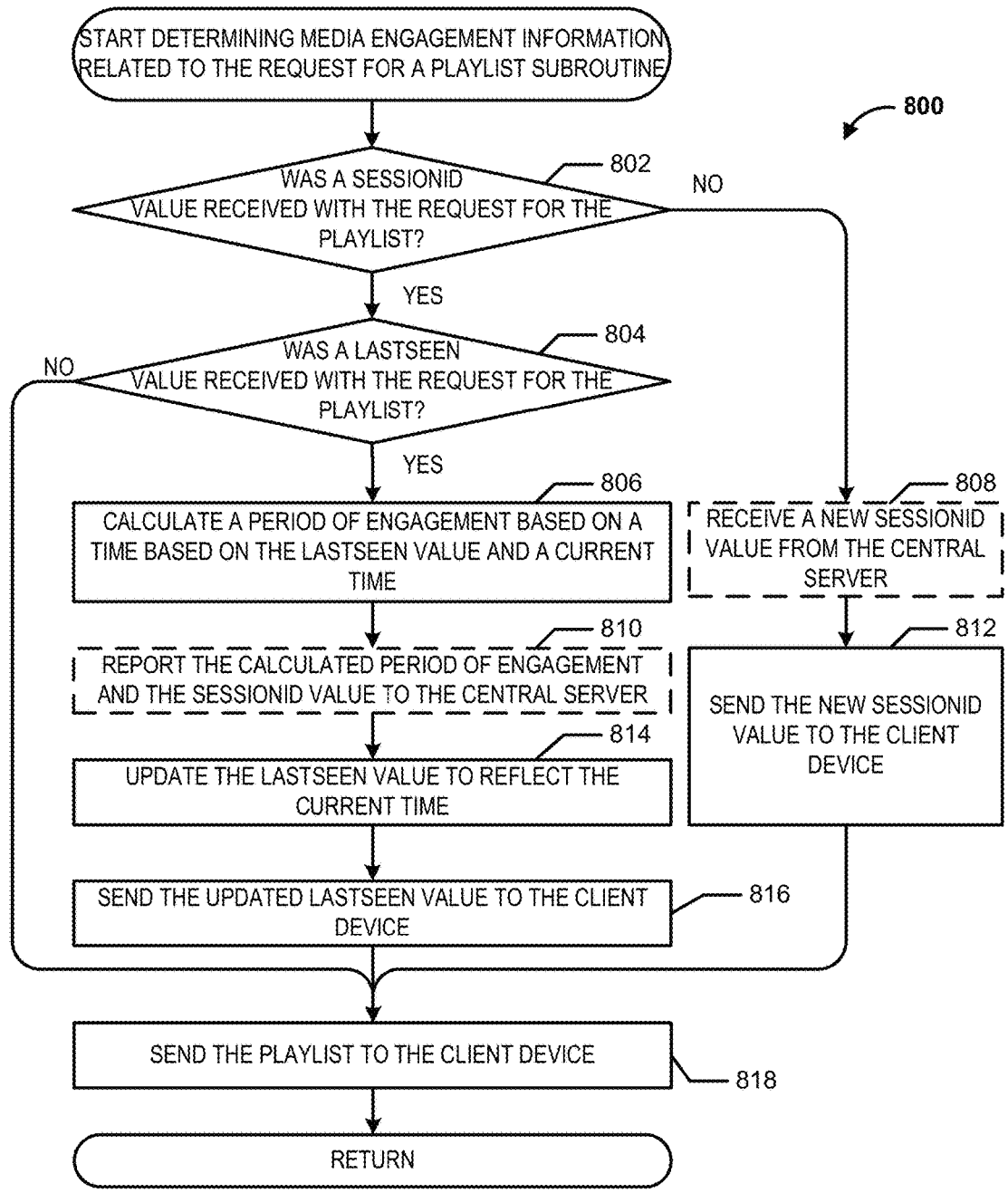
FIG. 8 is a process flow diagram illustrating a computer-implemented method for determining media engagement information related to a request for a playlist of media content, according to some embodiments.

FIG. 8 is a process flow diagram of an illustrative subroutine 800 for processing a request for a playlist for media content, according to some embodiments. The subroutine 800 may be implemented with a media engagement service operating on a content server (e.g., the media engagement service 414 of the content server 104a as described with reference to FIG. 4). The subroutine 800 implements an embodiment of the operations of block 608 of the routine 600 as described with reference to FIG. 6. As such, the media engagement service 414 may begin performing the operations of the subroutine 800 in response to determining that a request for a playlist for the media content has been received from a client device in decision block 602 of the subroutine 600.

In decision block 802, the media engagement service 414 may determine whether a SessionID value was received with the request for the playlist. In an example, the media engagement service 414 may determine whether the request for the playlist included or was received with cookie information that included the SessionID identifier and corresponding value.

In response to determining that a SessionID value was not received with the request for the playlist (i.e., decision block 802="NO"), the media engagement service 414 may optionally obtain new a SessionID value from the central server 202, in block 808. In some embodiments in which client devices may request fragments and playlists of media content from multiple content servers, the central server 202 may be responsible for issuing new SessionID values to ensure that each value is associated with only one client device, which may otherwise occur unintentionally in the event that two content servers associate or assign the same SessionID value to different client devices.

The media engagement service 414 may also send the new SessionID value to the client device, in block 812. The media engagement service 414 may send the new SessionID value in cookie information that is sent at the same time or in close in time to the playlist sent to the client device in block 818, as described below. In some embodiments of the operations performed in block 812, the media engagement service 414 may generate the new SessionID value without receiving the value from a central server (e.g., without performing operations described with reference to optional block 808). In such embodiments, a media engagement service on each content server may generate a unique SessionID that is not used by any other content server and that is not received from a central server. For example, the media engagement service 414 may generate a SessionID value that includes a first unique portion associated with the content server 104a (e.g., a unique content server ID) and a second portion (e.g., a time stamp).

In response to determining that a SessionID value was received with the request for the playlist (i.e., decision block 802="YES"), the media engagement service 414 may determine whether a LastSeen value was received with the request for the playlist, in decision block 804. As noted above, the media engagement service 414 may reference cookie information or other stateful information received with the request for the playlist to determine whether the cookie information includes a LastSeen identifier and a value for the LastSeen identifier.

In some embodiments in which the media content is live, the media engagement service 414 may leverage that fact that a client device may be required to download more than one playlist in order to download fragments that are continually being made available. The media engagement service 414 may then determine media engagement information related to the period of time that the client device is actively engaged in downloading the live media content by calculating the periods of time between the client device's requests for playlists. In such embodiments, in response to determining that a LastSeen value was received with the request for the playlist (i.e., decision block 804="YES"), the media engagement service 414 may calculate a period of engagement based on a time included in the LastSeen value and based on a current time, in block 806. The current time may be a time that the media engagement service 414 determines from a clock operating on the content server 104a or may request a time from the central server 202, which may be synchronized with one or more other content servers. Specifically, the LastSeen value may be a timestamp of a time associated with the last time that the client device received a playlist. Thus, the media engagement service 414 may subtract the time associated with the LastSeen value from the current time to calculate a period of time that has elapsed since the client device last requested a playlist for the live media content.

In some embodiments of the operations performed in block 814, the media engagement service 414 may adjust the period of engagement to reflect potential pauses or suspensions in the presentation of the live media content on the client device, which may be indicated by an unexpectedly long period of time between requests for playlists. In such embodiments, the media engagement service 414 may utilize a threshold amount of time corresponding to an expected period of time between playlist requests to determine whether the client device suspended the download of the live media content. In the event that a period of engagement calculated in block 806 exceeds this threshold amount of time, the media engagement service 414 may reduce the period of engagement to remove the time associated with the suspension of activity. For example, the media engagement service 414 may determine based on the threshold that there was an unexpected thirty second delay between playlist requests and thus may reduce the period of engagement by thirty seconds.

In some embodiments, the media engagement service 414 counter may associate a period of engagement that exceeds the threshold amount of time as a new media session. In such embodiments, the media engagement service 414 may maintain increment a counter for each new media session that is initiated. Specifically, in addition to incrementing the counter as described with reference to block 712 of FIG. 7, the media engagement service 414 may also increment the counter when there is an unexpectedly long delay between playlist requests (e.g., when the period of engagement calculated in block 806 exceeds the threshold amount of time).

In some embodiments (not shown), the media engagement service 414 may aggregate all of the periods of engagement associated with the same client device (e.g., based on the SessionID value of the client device) in order to determine the total period of time that the client device was actively engaged in downloading the live media content. In some optional embodiments, the media engagement service 414 may report the period of engagement calculated in block 806 and the SessionID value associated with the client device to the central server 202, in optional block 810. The central server 202 may receive one or more periods of engagement related to the client device from one or more content servers and may add these one or more periods of engagement to determine a total period of engagement for the client device.

In block 814, the media engagement service 414 may update the LastSeen value received from the client device to reflect the current time observed on the server. In a non-limiting example, the media engagement service 414 may prepare or generate updated cookie information that includes a value for the LastSeen identifier that is based on (or equal to) the current time. The media engagement service 414 may then send the updated LastSeen value to the client device, in block 816.

In response to sending the new a SessionID value to the client device in block 812, or in response to sending the updated a LastSeen value to the client device in block 814, the media engagement service 414 may send the playlist to the client device, in block 818.

Further, in response to determining that no a LastSeen value was received with the request for the playlist (i.e., decision block 804="NO"), the media engagement service 414 may send the playlist to the client device, in block 818. Specifically, the inclusion of the SessionID value with the request for the playlist may indicate that client device previously requested a playlist from the media engagement service 414 or another content server. However, the absence of a LastSeen value from the request for the playlist may indicate that the client device has not yet requested a fragment of the media content, which may further indicate that an error has occurred on the client device that may have prevent the client device from downloading fragments of the media content. For example, in response to the client device's last request for a playlist, the client device may have received a playlist file that was only partially transmitted or that was corrupted.

The media engagement service 414 may terminate operations of the subroutine 800 and may continue performing operations in the subroutine 600, such as by determining whether to continue processing requests in decision block 610 (e.g., as described with reference to FIG. 6).

Figure 9:
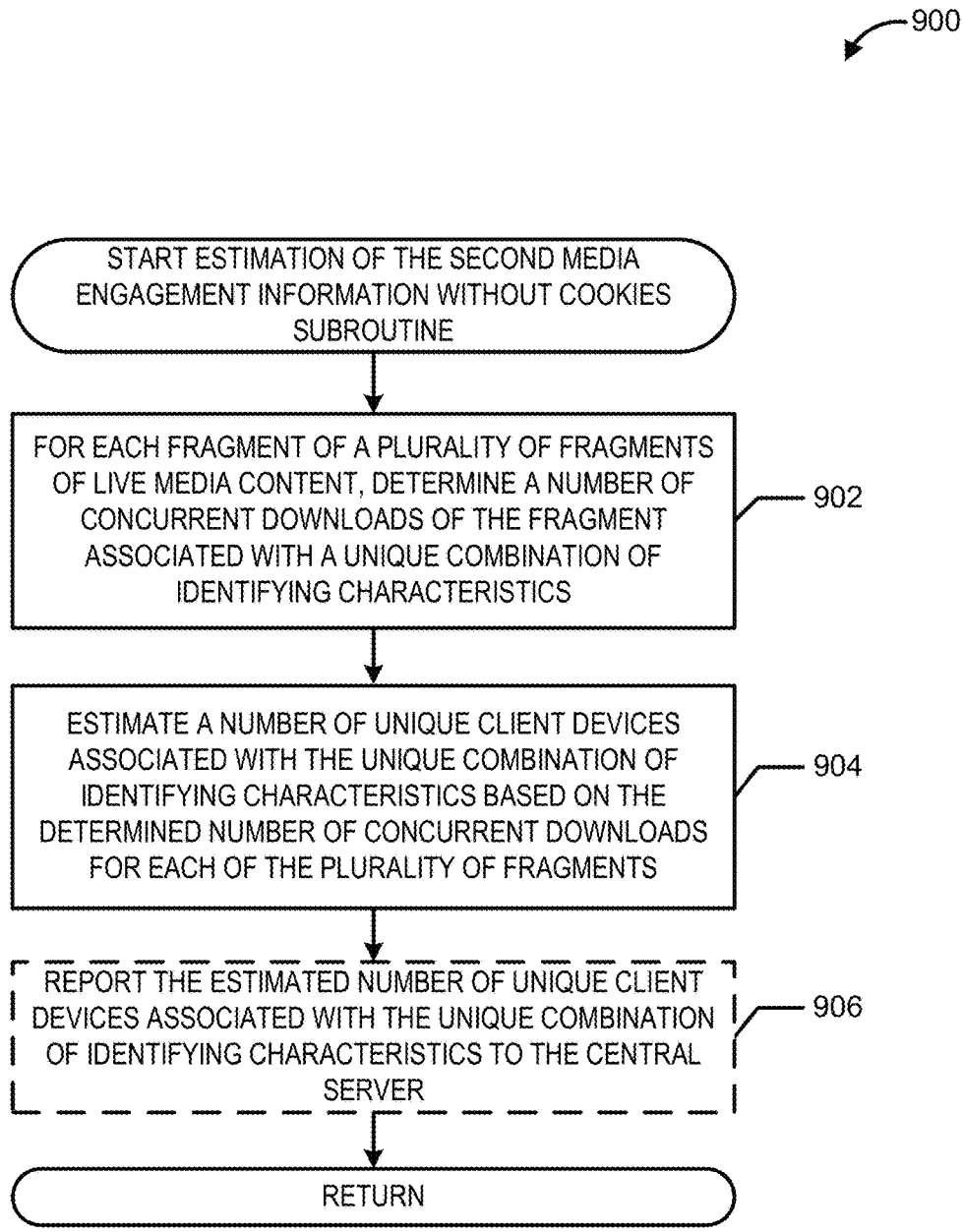
FIG. 9 is a process flow diagram illustrating a computer-implemented method for determining media engagement information for client devices that do not support cookies, according to some embodiments.

FIG. 9 is a process flow diagram of an illustrative subroutine 900 for estimating the second media engagement information for client devices that do not support cookies, according to some embodiments. The subroutine 900 may be implemented with a media engagement service operating on a content server (e.g., the media engagement service 414 of the content server 104a as described with reference to FIG. 4). The subroutine 900 implements an embodiment of the operations of block 506 of the routine 500 as described with reference to FIG. 5.

As described, some client devices may not or cannot support cookie information. For example, a user of a client device may disable cookies on the client device due to privacy concerns. Because these client devices do not support cookie information, the media engagement service 414 may not be able to determine media engagement information related to these client devices by using cookie information (e.g., as described with reference to FIGS. 1, 2, and 6-8).

In a suboptimal solution, the media engagement service 414 may estimate the number of client devices that are downloading media content based on the number of unique IP addresses associated with media requests instead of using cookie information (e.g., SessionID and LastSeen values). However, as described above (e.g., with reference to FIG. 3), the media engagement service 414 may receive media requests from multiple client devices that are behind a NAT, which may cause the requests from the multiple clients to appear to originate from a single IP address. Thus, the media engagement service 414 may estimate the number of unique client devices downloading media content based on the number of unique IP addresses associated with active downloads of the media content. However, this estimate may underrepresent the actual number of unique client devices because some client devices behind the NAT will not be included in the estimate. In an example, five client devices behind a NAT may request live media content from the media engagement service 414. If the NAT causes those requests to appear to originate from the same IP address and if the media engagement service 414 relies solely on the IP address to identify distinct client devices, the media engagement service 414 may estimate that there is only one unique client device downloading the live media content when, in actuality, there are five client devices downloading the live media content.

To account for the possibility that more than one client device may be associated with an IP address, the media engagement service 414 may perform the following operations in order to generate an accurate estimation of the number of unique client devices that have downloaded live media content without using cookie information.

In block 902, the media engagement service 414 may determine a number of concurrent downloads of a fragment of the live media content that are associated with a unique combination of identifying characteristics. The media engagement service 414 may perform the operations in block 902 for each fragment in the plurality of fragments of the live media content. In some embodiments, the unique combination of identifying characteristics associated with the download may include one or more of an IP address (e.g., a IP version 4 address, an IP version 6 address), a browser application or browser agent, a machine access code (MAC) address, a unique device identification number, or various other characteristics that may distinguish one client device from another. By including identifying characteristics other than the IP address, the media engagement service 414 may increase the likelihood of identifying separate, unique client devices that are downloading the live media content. For example, two client devices behind a NAT may appear to share the same IP address, but one of the client devices may use the Mozilla browser to download the live media content while the other client device uses the Chrome browser to download the live media. As a result, the media engagement service 414 may differentiate between those two client devices based on the browser that the client devices use to download the live media content.

In block 904, the media engagement service 414 may estimate a number of unique client devices that are associated with the unique combination of identifying characteristics based on the number of concurrent downloads for each of the plurality of fragments as determined in block 902. In particular, the media engagement service 414 may take advantage of the fact that each fragment of live media content is available for only a limited amount of time (e.g., twenty seconds). Given the relatively short window of time for client devices to download the fragment of live media content, each concurrent download of the live media content has a high likelihood of originating from a separate device. In contrast, generating an estimate based on concurrent downloads of on-demand media content may be less accurate as client devices may have an indefinite amount of time to download or re-download fragments.

In some embodiments, the media engagement service 414 may maintain a table or another data structure in the memory 410 that maps the number of concurrent downloads of each of the fragment that are associated with the unique combination of identifying characteristics. For example, the table may indicate that there were five concurrent downloads of a first fragment associated with a unique combination of IP address and user agent information and that there were three concurrent downloads of a second fragment associated with that unique combination. In such embodiments, the media engagement service 414 may utilize the mapping to estimate the number of unique client devices associated with the unique combination of identifying characteristics. The media engagement service 414 may estimate the number of unique client devices based on a mean, median, or mode number of concurrent downloads associated with the plurality of fragments. For example, the media engagement service 414 may estimate the number of unique client devices associated with the unique combination of identifying characteristics as five devices if the average number of concurrent downloads for each of the fragments is five. In another example, the media engagement service 414 may estimate the number of unique client devices as equal to ten in the event that a certain percentage (e.g., 80%) of the fragments are associated with ten concurrent downloads by the unique combination of identifying characteristics.

In some embodiments, the media engagement service 414 may derive other media engagement information from the number of concurrent downloads for each of the fragments in the live media content. For example, the media engagement service 414 may estimate a change in the number of client devices that viewed a first portion of the live media content in comparison to the number of client devices that viewed a second portion of the live media content based on a difference between the those two numbers. For example, there may be ten concurrent downloads for a first fragment and only four concurrent downloads for a second fragment. Thus, the media engagement service 414 may estimate that six client devices stopped downloading the live media content between the first fragment and the second fragment.

In further embodiments (not shown), the media engagement service 414 may perform the above operations in block 902 and block 904 for each unique combination of identifying characteristics in order to estimate a number of unique client devices for each of the unique combinations of identifying characteristics. In such embodiments, the media engagement service 414 may estimate a total number of unique client devices by adding together the estimated number of unique client devices for each of the unique combinations of the identifying characteristics.

In some embodiments, the media engagement service 414 may only perform the above operations for combinations of identifying characteristics that have been associated with client devices that have been designated as not supporting cookies, for example, as a result of determining that a SessionID value was not received with a request for a fragment in decision block 702 of FIG. 7 and as a result of designating that client device as not supporting cookies in optional block 704. In such embodiments, the media engagement service 414 may estimate the total number of unique client devices that do not support cookie information.

In some optional embodiments, the media engagement service 414 may optionally report the estimated number of unique client devices associated with the unique combination of IP address and user agent to the central server 202, in optional block 914. For example, the media engagement service 414 may send information to the central server 202 that indicates that a particular combination of IP address and user agent is estimated to be associated with a certain number of unique client devices. In these embodiments, the central server 202 may receive similar information from one or more content servers and may compile this information to produce an estimate of the total number of unique client devices associated with each unique combination of IP address and user agent.

The media engagement service 414 may terminate operations of the subroutine 900 and may continue performing operations in the subroutine 500, such as by optionally determining the combined media engagement information related to the media content in optional decision block 508 (e.g., as described with reference to FIG. 5).

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
one or more servers comprising one or more first processors in communication with a memory and configured with processor-executable instructions to perform operations comprising:
receiving a first request for a fragment of live media content from a client device, wherein the live media content comprises one or more fragments;
determining that a session identifier value was not received with the first request for a fragment of the media content from the client device;
parsing the first request to identify an Internet Protocol (IP) address and a browser application;
determining a number of concurrent downloads of each of the one or more fragments of the live media content, wherein the concurrent downloads are associated with the IP address and the browser application;
based on the number of concurrent downloads of each of the one or more fragments, estimating a number of unique client devices that are associated with the IP address and the browser application and that have downloaded the one or more fragments of the live media content; and
sending the estimated number of unique client devices to one or more other servers.

2. The system of claim 1, wherein the one or more processors are configured with processor-executable instructions to perform operations such that estimating a number of unique client devices that are associated with the IP address and the browser application and that have downloaded the one or more fragments of the live media content comprises determining an average number of concurrent downloads of the one or more fragments of the live media content associated with the IP address and the browser application.

3. The system of claim 1, wherein the one or more processors are configured with processor-executable instructions to perform operations further comprising:
determining a first number of concurrent downloads of one or more fragments of a first portion of the live media content, wherein the concurrent downloads of the one or more fragments of the first portion of the live media content are associated with the IP address and the browser application; and
determining a second number of concurrent downloads of one or more fragments of a second portion of the live media content, wherein the concurrent downloads of the one or more fragments of the second portion of the live media content are associated with the IP address and the browser application.

4. The system of claim 3, wherein the one or more processors are configured with processor-executable instructions to perform operations further comprising:
estimating a first number of unique client devices associated with the IP address and the browser application based on the number of concurrent downloads of the one or more fragments of the first portion of the live media content; and
estimating a second number of unique client devices associated with the IP address and the browser application based on the number of concurrent downloads of the one or more fragments of the second portion of the live media content.

5. The system of claim 4, wherein the one or more processors are configured with processor-executable instructions to perform operations further comprising:
determining a difference between the first number of unique client devices and the second number of unique client devices; and
determining a change in a number of unique client devices that are associated with the IP address and the browser application and that have downloaded at least a portion of the one or more fragments of the live media content based at least in part on the difference.

6. A system comprising:
a server comprising one or more processors in communication with a memory and configured with processor-executable instructions to perform operations comprising:
receiving download requests for media content from a plurality of computing devices;
identifying a first subset of computing devices of the plurality of computing devices that do not support storage of stateful information, wherein each computing device of the first subset of computing devices is associated with an identifier;
determining a number of concurrent downloads of the media content associated with each identifier; and
estimating a first number of computing devices in the first set of computing devices based on the number of concurrent downloads of the live content of media associated with each identifier.

7. The system of claim 6, wherein one or more processors are configured with processor-executable instructions to perform operations further comprising:
identifying a second subset of computing devices of the plurality of computing devices, wherein each computing device of the second subset of computing devices supports storage of stateful information;
determining a second number of computing devices in the second subset of computing devices; and
estimating a total number of computing devices that have downloaded the media content based on the first number of computing devices and the second number of computing devices.

8. The system of claim 6, wherein an identifier comprises a combination of an Internet Protocol address and user agent information.

9. The system of claim 6, wherein one or more processors are configured with processor-executable instructions to perform operations such that:
receiving download requests for the media content from a plurality of computing devices comprises receiving requests for a fragment of live content of media from the plurality of computing devices; and
identifying a first subset of computing devices of the plurality of computing devices that do not support storage of stateful information comprises identifying one or more computing devices of the plurality of computing devices associated with requests for a fragment of the live content of media that were received without stateful information.

10. The system of claim 9, wherein one or more processors are configured with processor-executable instructions to perform operations further comprising:
prior to receiving the requests for a fragment of the live media content:
receiving requests for a playlist of the media content from each of the first subset of computing devices; and
sending the playlist of the media content and stateful information to each of the first subset of computing devices.

11. The system of claim 6, wherein one or more processors are configured with processor-executable instructions to perform operations further comprising:
determining that one or more of requests were received with stateful information;
identifying a second subset of computing devices of the plurality of computing devices that do support storage of stateful information, wherein the second subset of computing devices is associated with the one or more requests received with stateful information; and
excluding the second subset of computing devices from an estimation of the first number of computing devices.

12. A method implemented on a server, comprising:
identifying an identifying characteristic of a first computing device;
determining a first number of parallel downloads of at least a first portion of live media content, wherein download requests for the at least first portion of the live media content are:
associated with the identifying characteristic; and
not received with stateful information; and
estimating a first number of first computing devices that downloaded the at least first portion of the live media content based at least in part on the first number of parallel downloads.

13. The method of claim 12, wherein the identifying characteristic comprises at least one of an Internet Protocol Version 4 address, an Internet Protocol Version 6 address, user agent information identifying a browser application, a machine access control address, or a unique device identification number.

14. The method of claim 12, wherein estimating a first number of computing devices that downloaded the at least first portion of the live media content based at least in part on the first number of parallel downloads comprises:
determining a number of parallel downloads for each fragment in the at least first portion of the live media content; and
estimate the first number of computing devices that downloaded the at least first portion of the live media content based at least in part on the number of parallel downloads for each fragment in the at least first portion of the live media content.

15. The method of claim 14, wherein the first number of computing devices corresponds to an average number of parallel downloads of fragments of the at least first portion of the live media content.

16. The method of claim 12, further comprising:
- determining a second number of parallel downloads of at least a second portion of the live media content, wherein download requests for the at least second portion of the live media content are associated with the identifying characteristic; and
- estimating a second number of computing devices that downloaded the at least second portion of the live media content based at least in part on the second number of parallel downloads.

17. The method of claim 16, further comprising determining a change in a number of computing devices that viewed the live media content based at least in part on the first number of computing devices that downloaded the at least first portion of the live content and the second number of computing devices that downloaded the at least second portion of the live content.

18. The method of claim 12, wherein determining that a first computing device does not support storage of stateful information comprises:
- receiving a request for a fragment of the at least first portion of the live media content of media from the first computing device; and
- determining that the request for the fragment was received without an identifier.

19. The method of claim 18, further comprising, prior to receiving the request for a fragment of the at least first portion of the live media content:
- receiving a request for a playlist of the at least first portion of the live media content of media from the first computing device;
- determining that the request for the playlist was received without an identifier value; and
- sending an identifier value to the first computing device.

20. The method of claim 12, further comprising:
- receiving a request for a fragment of the live media content from a second computing device;
- determining that the request for the fragment was received with a first identifier value; and
- incrementing a second number of computing devices that downloaded the at least first portion of the live media content.

21. The method of claim 20, further comprising:
- prior to receiving the request for a fragment of the live content of media from the second computing device:
  - receiving a request for a playlist of the live content of media from the second computing device;
  - determining the request for the playlist was not received with an identifier; and
  - sending the playlist and the first identifier value to the second computing device.

22. The method of claim 20, further comprising estimating a total number of computing devices that consumed the live media content based at least in part on the first number of computing device and the second number of computing devices.

* * * * *